US012216417B2

(12) United States Patent
Sato

(10) Patent No.: US 12,216,417 B2
(45) Date of Patent: Feb. 4, 2025

(54) IMAGE FORMING APPARATUS AND CARTRIDGE

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/310,646

(22) Filed: May 2, 2023

(65) Prior Publication Data

US 2024/0004328 A1 Jan. 4, 2024

(30) Foreign Application Priority Data

Jun. 30, 2022 (JP) ................................ 2022-106715

(51) Int. Cl.
*G03G 15/08* (2006.01)

(52) U.S. Cl.
CPC ..... *G03G 15/0887* (2013.01); *G03G 15/0865* (2013.01)

(58) Field of Classification Search
CPC ....................... G03G 15/0865; G03G 15/0887
USPC ......................... 399/149, 150, 253, 358–360
See application file for complete search history.

(56) References Cited

U.S. PATENT DOCUMENTS

2021/0066134 A1 4/2021 Hayashida et al.
2021/0124284 A1* 4/2021 Hayashida ............ G06F 3/1238
2021/0405577 A1 12/2021 Noguchi et al.
2023/0062417 A1* 3/2023 Kato .................. G03G 15/0887

FOREIGN PATENT DOCUMENTS

JP 2020-154300 A 9/2020
JP 2021-66134 A 4/2021

* cited by examiner

*Primary Examiner* — Hoan H Tran
(74) *Attorney, Agent, or Firm* — Merchant & Gould P.C.

(57) ABSTRACT

An image forming apparatus includes a main housing, a photosensitive drum, a development housing, a development roller, a container, and a return toner pipe. The development housing is configured to contain toner. The development roller is configured to supply toner in the development housing to the photosensitive drum. The container has an insertion opening configured such that a toner container is inserted therein. The toner container contains toner to be replenished to the development housing. The return toner pipe is configured to allow passage of return toner. The return toner is toner that returns from the photosensitive drum to the development housing.

22 Claims, 22 Drawing Sheets

104Y

104Y

IMAGE FORMING APPARATUS AND CARTRIDGE

REFERENCE TO RELATED APPLICATIONS

This application claims priority from Japanese Patent Application No. 2022-106715 filed on Jun. 30, 2022. The entire content of the priority application is incorporated herein by reference.

BACKGROUND ART

An image forming apparatus including a photosensitive drum and a development unit is known.

DESCRIPTION

A development unit includes a development roller and a development container configured to contain toner. In a known image forming apparatus, a toner pack containing toner is attached to an attachment portion of the development container, and the toner in the toner pack is replenished to the development container.

In the image forming apparatus, without cleaning a photosensitive drum on which transfer residual toner remains, a pre-exposure device removes electricity from the surface of the photosensitive drum in a state where the residual toner remains on the photosensitive drum, and then the surface of the photosensitive drum is charged by a charging roller and is exposed to light by a scanner unit, and the transfer residual toner remaining in the non-exposed area is collected in the development container by the development roller (so-called cleanerless configuration).

When such a cleanerless configuration is employed in an image forming apparatus configured to replenish toner to a development container, for example, transfer residual toner, external additives contained in the transfer residual toner, and paper dust may adhere to the charging roller, which may adversely affect image quality.

Further, since the transfer residual toner is collected by the development roller and used as it is for the next development, the transfer residual toner may adversely affect the image quality.

Further, when the development roller collects transfer residual toner, the development roller also collects paper dust. As a result, the paper dust is caught between the development roller and a layer regulating blade, which may adversely affect the image quality.

When these problems occur, it becomes necessary to replace the photosensitive drum and the development unit. As a result, the frequency of replacement of the photosensitive drum and the development unit increases, which may increase the environmental load.

In view of the foregoing, an example of an object of this disclosure is to provide an image forming apparatus and a cartridge that suppress return toner that returns from a photosensitive drum to a development housing and paper dust mixed with the return toner adversely affecting image quality and reducing the frequency of replacement of a photosensitive drum and a development roller, thereby suppressing an increase in the environmental load in an image forming apparatus configured to replenish toner to the development housing.

According to some aspects, this specification discloses an image forming apparatus and a cartridge. The image forming apparatus includes a main housing, a photosensitive drum, a development housing, a development roller, a container, and a return toner pipe. The cartridge includes a photosensitive drum, a development housing, a development roller, a container, and a return toner pipe. The development housing is configured to contain toner. The development roller supplies toner in the development housing to the photosensitive drum. The container has an insertion opening configured such that a toner container is inserted therein. The toner container contains toner to be replenished to the development housing. The return toner pipe is configured to allow passage of return toner. Thus, return toner returns from the photosensitive drum to the development housing through the return toner pipe. Thus, the return toner and the replenished toner are mixed before being supplied to the development roller, thereby suppressing an influence of the return toner on image quality.

1. IMAGE FORMING APPARATUS

An outline of an image forming apparatus 1 according to a first embodiment will be described with reference to FIGS. 1 and 2.

Figure 1:
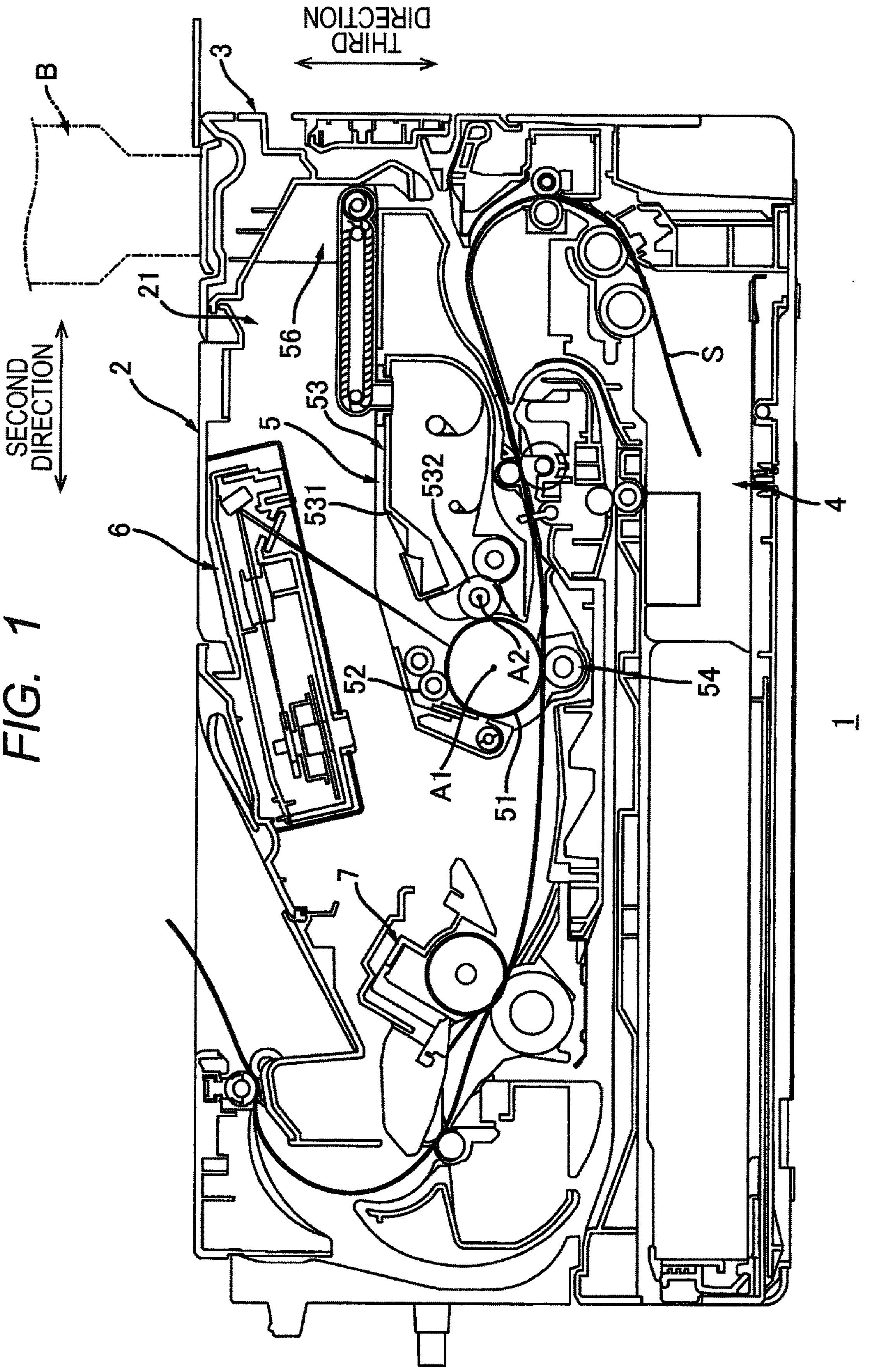
FIG. 1 is a diagram showing a schematic configuration of an image forming apparatus.

As shown in FIG. 1, the image forming apparatus 1 is an image forming apparatus dedicated to monochrome printing.

The image forming apparatus 1 includes a main housing 2, a cover 3, a sheet storage portion 4, a cartridge 5, an exposure device 6, and a fuser 7.

1.1 Main Housing 2

The main housing 2 accommodates the sheet storage portion 4, the cartridge 5, the exposure device 6, and the fuser 7. The main housing 2 has a main opening 21 (see FIG. 2). The main opening 21 is located at one end of the main housing 2 in a second direction. The second direction will be described later.

1.2 Cover 3

Figure 2:
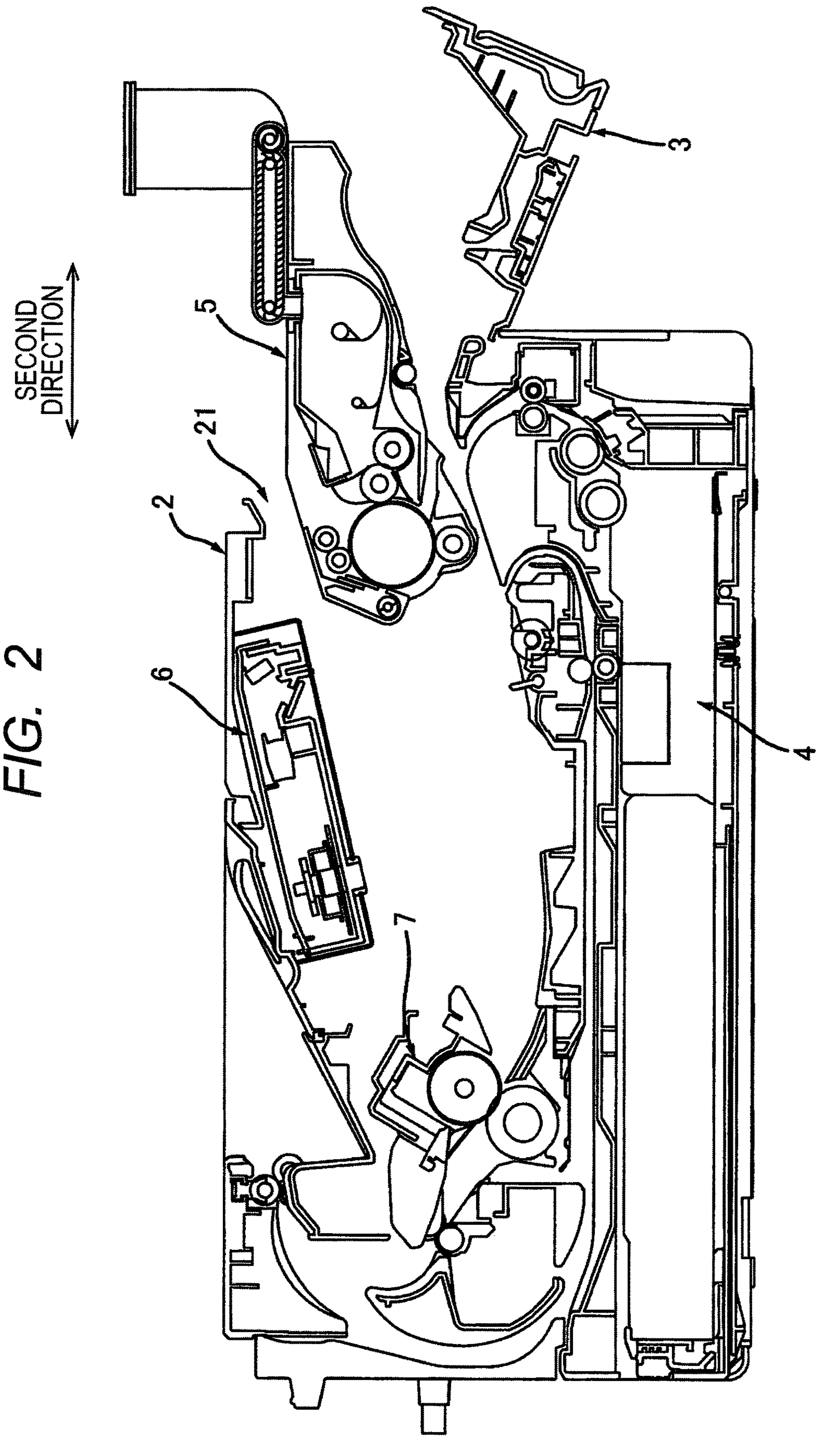
FIG. 2 is an explanatory diagram explaining attachment and detachment of a cartridge shown in FIG. 1.

The cover 3 is movable between a closed position (see FIG. 1) and an open position (see FIG. 2). As shown in FIG. 1, the cover 3 closes the main opening 21 in a state where the cover 3 is located at the closed position. As shown in FIG. 2, the main opening 21 is opened in a state where the cover 3 is located at the open position.

1.3 Sheet Storage Portion 4

As shown in FIG. 1, the sheet storage portion 4 stores sheets S therein. The sheet S in the sheet storage portion 4 is conveyed toward a transfer roller 54. The transfer roller 54 will be described later.

1.4 Cartridge 5

The cartridge 5 is attachable to the image forming apparatus 1. Specifically, the cartridge 5 is attached to inside the main housing 2. As shown in FIG. 2, in a state where the cover 3 is located at the open position, the cartridge 5 is attachable to and detachable from the main housing 2 through the main opening 21 in the second direction. The cartridge 5 is replaced, for example, at timing when deterioration of a photosensitive drum 51 or a development roller 532 is assumed. The timing at which the cartridge 5 is replaced is not limited. The photosensitive drum 51 and the development roller 532 will be described later.

As shown in FIG. 1, the cartridge 5 includes the photosensitive drum 51, a charger 52, a development unit 53, and a transfer roller 54. In other words, the image forming apparatus 1 includes the photosensitive drum 51.

1.4.1 Photosensitive Drum 51

The photosensitive drum 51 is rotatable about a drum axis A1. The drum axis A1 extends in the first direction in a state where the cartridge 5 is attached to the main housing 2. The photosensitive drum 51 extends in the first direction. The photosensitive drum 51 has a cylindrical shape.

In a state where the cartridge 5 is attached to the main housing 2, the photosensitive drum 51 is located between the fuser 7 and the cover 3 in the second direction. The second direction crosses the first direction. The second direction may be perpendicular to the first direction. The second direction is a horizontal direction in a state where the image forming apparatus 1 is placed on a horizontal surface.

In a state where the cartridge 5 is attached to the main housing 2, the photosensitive drum 51 is located between the sheet storage portion 4 and the exposure device 6 in a third direction. The third direction crosses the first direction and the second direction. The third direction may be perpendicular to the first direction and the second direction. The third direction is a vertical direction in a state where the image forming apparatus 1 is placed on a horizontal surface. The photosensitive drum 51 is located below the exposure device 6 in a state where the image forming apparatus 1 is placed on a horizontal surface and the cartridge 5 is attached to the main housing 2.

1.4.2 Charger 52

The charger 52 charges the photosensitive drum 51. In this embodiment, the charger 52 is a charging roller. In a case where the charger 52 is a charging roller, the charger 52 contacts the photosensitive drum 51. The charger 52 may be a scorotron type charger.

1.4.3 Development Unit 53

In a state where the cartridge 5 is attached to the main housing 2, the development unit 53 is located between the photosensitive drum 51 and the cover 3 in the second direction. In a state where the cartridge 5 is attached to the main housing 2, the development unit 53 is located between the exposure device 6 and the sheet storage portion 4 in the third direction. The development unit 53 supplies toner to the photosensitive drum 51. The development unit 53 includes a development housing 531 and the development roller 532. In other words, the image forming apparatus 1 includes the development housing 531 and the development roller 532. Further, the cartridge 5 includes the development housing 531 and the development roller 532.

The development housing 531 supports the development roller 532. The development housing 531 contains toner.

The development roller 532 supplies the toner in the development housing 531 to the photosensitive drum 51. The development roller 532 contacts the photosensitive drum 51. The development roller 532 may be separatable from the photosensitive drum 51. The development roller 532 extends in the first direction. The development roller 532 is rotatable about a development axis A2. The development axis A2 extends in the first direction in a state where the cartridge 5 is attached to the main housing 2.

1.4.4 Transfer Roller 54

The transfer roller 54 transfers toner on the photosensitive drum 51 to the sheet S. Specifically, the sheet S from the sheet storage portion 4 passes between the transfer roller 54 and the photosensitive drum 51. At this time, the transfer roller 54 transfers the toner on the photosensitive drum 51 to the sheet S.

1.5 Exposure Device 6

In a state where the cartridge 5 is attached to the main housing 2, the exposure device 6 exposes the surface of the photosensitive drum 51 charged by the charger 52. The development unit 53 supplies toner to the exposed surface of the photosensitive drum 51. In this embodiment, the exposure device 6 is a laser scanning unit. The exposure device 6 may be an LED head.

1.6 Fuser 7

The fuser 7 is located away from the cover 3 in the second direction. The fuser 7 fixes the toner to the sheet S. In this embodiment, the fuser 7 fixes toner to the sheet S by heating and pressurizing the sheet S on which toner has been transferred. After passing through the fuser 7, the sheet S is discharged onto the upper surface of the main housing 2.

2. DETAILS OF CARTRIDGE 5

Next, details of the cartridge 5 will be described with reference to FIGS. 1 and 3 to 5. In the following description of the cartridge 5, "first direction", "second direction", and "third direction" refer to "the first direction", "second direction", and "third direction" in a state where the cartridge 5 is attached to the main housing 2.

As shown in FIG. 1, in the image forming apparatus 1 of the present disclosure, toner is replenished to the development unit 53 in a state where the cartridge 5 attached to the main housing 2. To replenish toner, in a state where the cartridge 5 is attached to the main housing 2, an operator connects a toner container B containing toner to be replenished to the development housing 531 to a replenishment portion 56 of the cartridge 5. The replenishment portion 56 will be described later. The replenishment portion 56 is configured to replenish the toner in the toner container B to the development unit 53 in both a state where the image forming apparatus 1 is forming an image and a state where the image forming apparatus 1 is not forming an image. After replenishment of toner is completed, the toner container B is removable from the replenishment portion 56 of the cartridge 5 in both the state where the image forming apparatus 1 is forming an image and the state where the image forming apparatus 1 is not forming an image.

Figure 3:
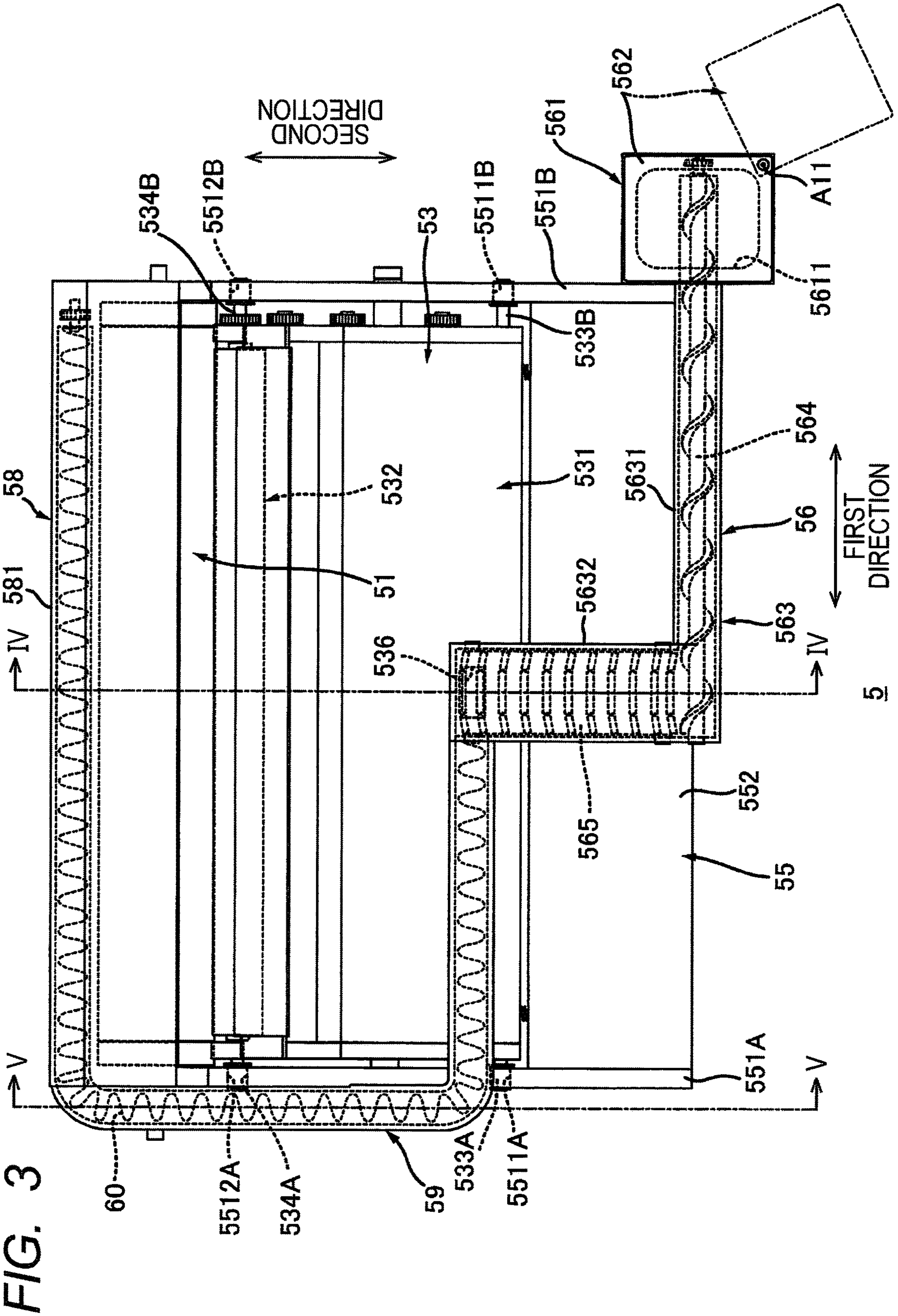
FIG. 3 is a plan view of the cartridge shown in FIG. 1.
Figure 4:
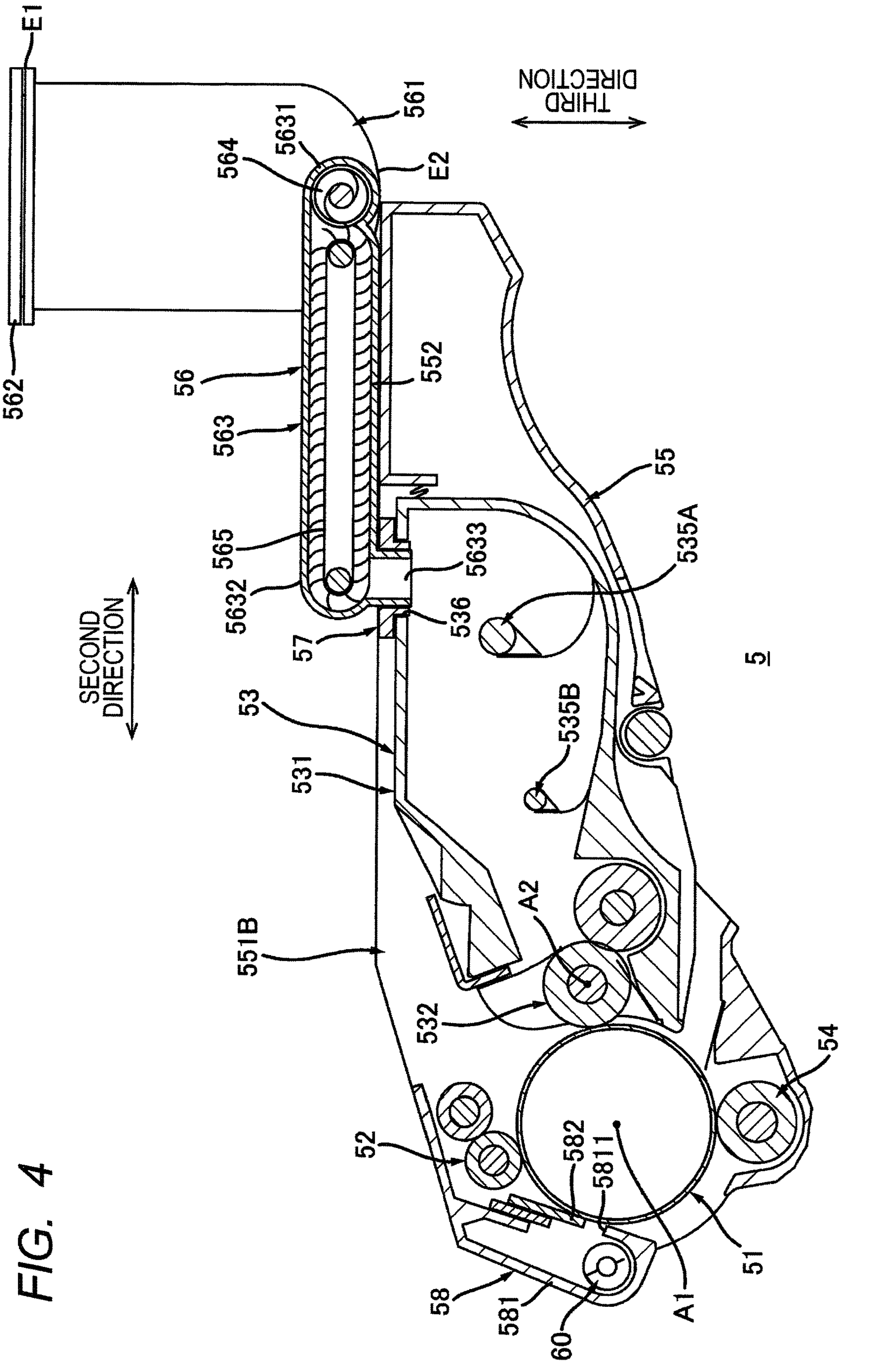
FIG. 4 is a cross-sectional view of the cartridge shown in FIG. 3, taken along a line IV-IV.

As shown in FIG. 3, the cartridge 5 includes a drum frame 55, the replenishment portion 56, a seal member 57 (see FIG. 4), a drum cleaner 58 (see FIG. 4), a return toner pipe 59, and a return toner conveyor 60, in addition to the photosensitive drum 51, the charger 52 (see FIG. 4), the development unit 53 and the transfer roller 54 (see FIG. 4). In other words, the image forming apparatus 1 includes the drum frame 55 and the return toner pipe 59.

2.1 Drum Frame 55

The drum frame 55 supports the photosensitive drum 51, the charger 52, the development unit 53, the transfer roller 54, the replenishment portion 56, the drum cleaner 58, and the return toner pipe 59. The drum frame 55 includes a first drum side plate 551A, a second drum side plate 551B, and a support plate 552.

2.1.1 First Drum Side Plate 551A

Figure 5:
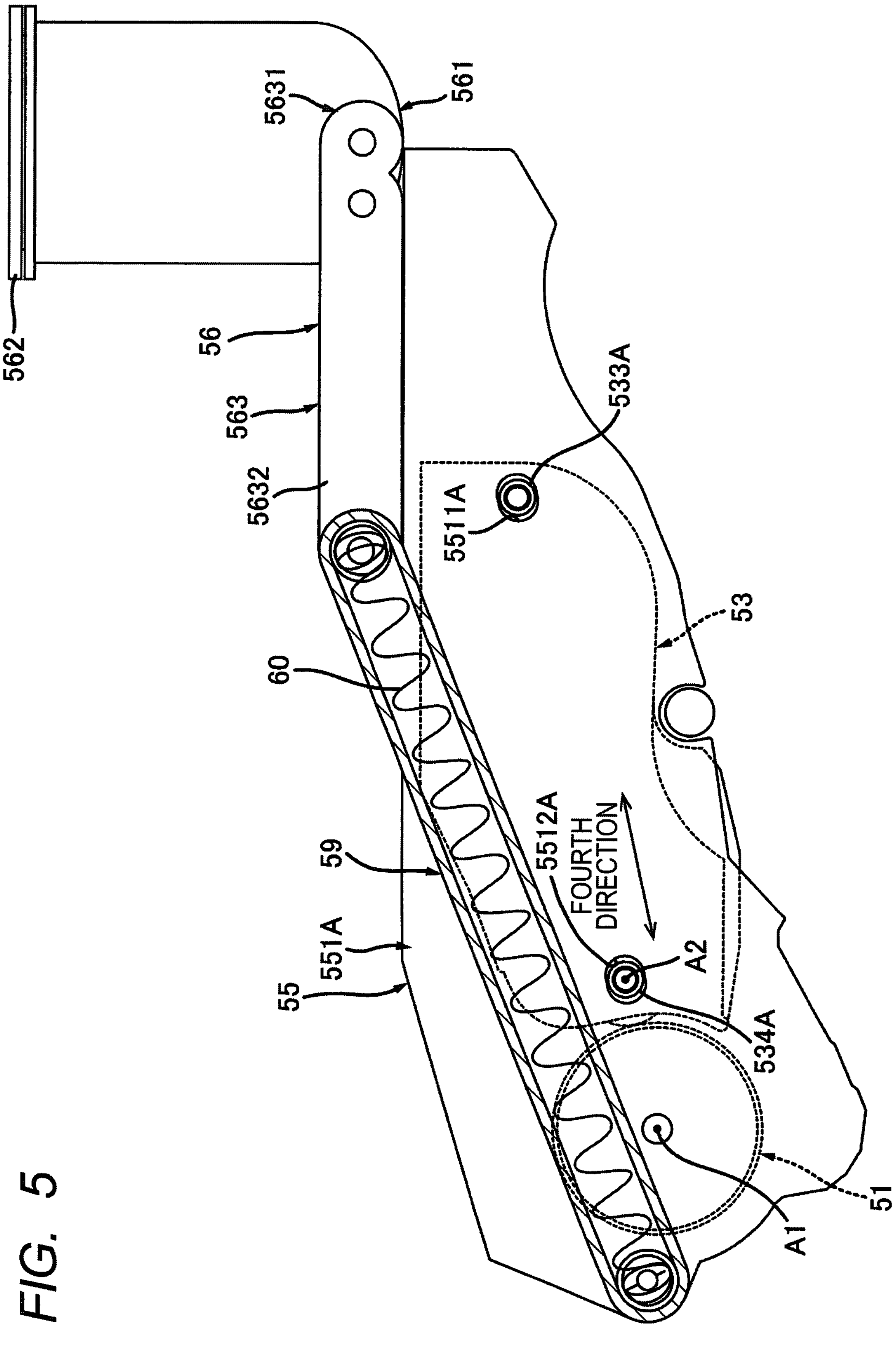
FIG. 5 is a cross-sectional view of the cartridge shown in FIG. 3, taken along a line V-V.

The first drum side plate 551A is located at one end of the drum frame 55 in the first direction. The first drum side plate 551A extends in the second direction and the third direction. The first drum side plate 551A supports one end of the photosensitive drum 51 in the first direction and one end of the development unit 53 in the first direction. As shown in FIG. 5, the first drum side plate 551A has two through holes 5511A and 5512A.

The through hole 5511A is located away from the photosensitive drum 51 in a fourth direction. The fourth direction is the direction connecting the drum axis A1 and the development axis A2. The through hole 5511A extends in the fourth direction. The through hole 5511A is an elongated hole.

The through hole 5512A is located between the photosensitive drum 51 and the through hole 5511A in the fourth direction. The through hole 5512A is located away from the through hole 5511A in the fourth direction. The through hole 5512A extends in the fourth direction. The through hole 5512A is an elongated hole.

2.1.2 Second Drum Side Plate 551B

As shown in FIG. 3, the second drum side plate 551B is located at the other end of the drum frame 55 in the first direction. The second drum side plate 551B is located away from the first drum side plate 551A in the first direction. The second drum side plate 551B extends in the second direction and the third direction. The second drum side plate 551B supports the other end of the photosensitive drum 51 in the first direction and the other end of the development unit 53 in the first direction. The second drum side plate 551B has two through holes 5511B and 5512B.

The through hole 5511B is located away from the photosensitive drum 51 in the fourth direction (see FIG. 5). The through hole 5511B extends in the fourth direction. The through hole 5511B is an elongated hole.

The through hole 5512B is located between the photosensitive drum 51 and the through hole 5511B in the fourth direction. The through hole 5512B is located away from the through hole 5511B in the fourth direction. The through hole 5512B extends in the fourth direction. The through hole 5512B is an elongated hole.

2.1.3 Support Plate 552

The support plate 552 is located between the first drum side plate 551A and the second drum side plate 551B in the first direction. The support plate 552 extends in the first direction. One end of the support plate 552 in the first direction is connected to the first drum side plate 551A. The other end of the support plate 552 in the first direction is connected to the second drum side plate 551B. As shown in FIG. 4, the support plate 552 supports the replenishment portion 56.

2.2 Details of Development Unit 53

As shown in FIG. 3, the development unit 53 is located between the first drum side plate 551A and the second drum side plate 551B in the first direction. Specifically, the development housing 531 is located between the first drum side plate 551A and the second drum side plate 551B in the first direction.

The development unit 53 includes two protrusions 533A and 534A, two protrusions 533B and 534B, and a plurality of agitators 535A and 535B (see FIG. 4), in addition to the development housing 531 and the development roller 532 described above. The development housing 531 has a reception port 536.

2.2.1 Protrusions 533A and 534A

As shown in FIG. 5, the protrusion 533A is located away from the photosensitive drum 51 in the fourth direction. The protrusion 533A is located at one end of the development unit 53 in the first direction. The protrusion 533A extends in the first direction. In this embodiment, the protrusion 533A extends from an outer surface of the developer housing 531 on one side in the first direction. The protrusion 533A may be attached to the outer surface of the development housing 531 on one side in the first direction. The protrusion 533A has a cylindrical shape. The protrusion 533A fits into the through hole 5511A (see FIG. 5) of the first drum side plate 551A.

The protrusion 534A is located between the photosensitive drum 51 and the protrusion 533A in the fourth direction. The protrusion 534A is located at one end of the development unit 53 in the first direction. The protrusion 534A extends in the first direction. In this embodiment, the protrusion 534A is one end of a shaft of the development roller 532. The protrusion 534A may extend from an outer surface of the development housing 531 on one side in the first direction. The protrusion 534A may be attached to the outer surface of the development housing 531 on one side in the first direction. The protrusion 534A has a cylindrical shape. The protrusion 534A fits into the through hole 5512A (see FIG. 5) of the first drum side plate 551A.

2.2.2 Protrusions 533B and 534B

As shown in FIG. 3, the protrusion 533B is located away from the photosensitive drum 51 in the fourth direction (see FIG. 5). The protrusion 533B is located at the other end of the development unit 53 in the first direction. The protrusion 533B extends in the first direction. In this embodiment, the protrusion 533B extends from an outer surface of the development housing 531 on the other side in the first direction. The protrusion 533B may be attached to the outer surface of the development housing 531 on the other side in the first direction. The protrusion 533B has a cylindrical shape. The protrusion 533B fits into the through hole 5511B of the second drum side plate 551B.

The protrusion 534B is located between the photosensitive drum 51 and the protrusion 533B in the fourth direction. The protrusion 534B is located at the other end of the development unit 53 in the first direction. The protrusion 534B extends in the first direction. In this embodiment, the protrusion 534B is the other end of the shaft of the development roller 532. The protrusion 534B may extend from an outer surface of the development housing 531 on the other side in the first direction. The protrusion 534B may be attached to the outer surface of the development housing 531 on the other side in the first direction. The protrusion 534B has a cylindrical shape. The protrusion 534B fits into the through hole 5512B of the second drum side plate 551B.

The protrusion 533A fits into the through hole 5511A of the first drum side plate 551A, the protrusion 534A fits into the through hole 5512A of the first drum side plate 551A, the protrusion 533B fits into the through hole 5511B of the second drum side plate 551B, and the protrusions 534B fits into the through holes 5512B of the second drum side plate 551B, whereby the development unit 53 is supported by the drum frame 55. The development unit 53 is movable in the fourth direction with respect to the photosensitive drum 51.

2.2.3 Agitators 535A and 535B

As shown in FIG. 4, the agitator 535A is located inside the development housing 531. The agitator 535A agitates and conveys the toner in the development housing 531 toward the development roller 532. The agitator 535A is located away from the development roller 532 in the second direction. The agitator 535A is located farthest from the development roller 532 in the second direction among the plurality of agitators 535A and 535B.

The agitator 535B is located within the development housing 531. The agitator 535B agitates and conveys the toner in the development housing 531 toward the development roller 532, in cooperation with the agitator 535A. The agitator 535B is located between the agitator 535A and the development roller 532 in the second direction.

2.2.4 Reception Port 536

As shown in FIG. 3, the reception port 536 is located in a center portion of the development housing 531 in the first direction. As shown in FIG. 4, the reception port 536 communicates with the internal space of the development housing 531. The reception port 536 overlaps the agitator 535A in the third direction. In a state where the cartridge 5 is attached to the main housing 2, the reception port 536 is located above the agitator 535A. A discharge portion 5633 of the replenishment portion 56 is fitted into the reception port 536. The discharge portion 5633 will be described later.

2.3 Replenishment Portion 56

The replenishment portion 56 is connectable to the toner container B (see FIG. 1). The replenishment portion 56 supplies toner from the toner container B to the development unit 53.

As shown in FIGS. 3 and 4, the replenishment portion 56 includes a container 561, a lid 562, a replenishment toner pipe 563, an auger screw 564, and a belt conveyor 565. In other words, the image forming apparatus 1 includes the container 561 and the replenishment toner pipe 563.

2.3.1 Container 561

The container 561 is connectable to the toner container B. In a state where the toner container B is connected to the container 561, the container 561 receives toner from the toner container B.

As shown in FIG. 3, the container 561 is located on the opposite side of the first drum side plate 551A with respect to the second drum side plate 551B in the first direction. The container 561 is located away from the photosensitive drum 51 in the second direction. The container 561 is located away from the development unit 53 in the second direction.

As shown in FIG. 4, the container 561 extends in the third direction. The container 561 has a cylindrical shape. The container 561 has a first end E1 and a second end E2 in the third direction. As shown in FIG. 1, in a state where the cartridge 5 is attached to the main housing 2 and the cover 3 is located at the closed position, the first end E1 (see FIG. 4) is located outside the main housing 2. In a state where the cartridge 5 is attached to the main housing 2 and the cover 3 is located at the closed position, the second end E2 (see FIG. 4) is located inside the main housing 2. As shown in FIG. 3, the container 561 has an insertion opening 5611. In other words, the replenishment portion 56 has the insertion opening 5611.

The insertion opening 5611 is provided at the first end E1. The toner container B (see FIG. 1) is inserted into the insertion opening 5611.

2.3.2 Lid 562

The lid 562 is movable between a closed position (shown in solid lines in FIG. 3) and an open position (shown in imaginary lines in FIG. 3). In a state where the lid 562 is located at the closed position, the lid 562 closes the insertion opening 5611. In a state where the lid 562 is located at the open position, the insertion opening 5611 is opened. The lid 562 has a flat plate shape. The lid 562 is rotatable about an axis A11 between the closed position and the open position. The axis A11 extends in the third direction.

2.3.3 Replenishment Toner Pipe 563

The replenishment toner pipe 563 allows passage of toner replenished from the container 561 to the development unit 53. In other words, the toner replenished from the container 561 to the development unit 53 passes through the replenishment toner pipe 563. The replenishment toner pipe 563 includes a first portion 5631, a second portion 5632, and a discharge portion 5633 (see FIG. 4).

The first portion 5631 is located between the container 561 and the second portion 5632 in the first direction. The first portion 5631 extends in the first direction. One end of the first portion 5631 in the first direction connects with the second portion 5632. The other end of the first portion 5631 in the first direction connects with the second end E2 of the container 561 (see FIG. 4).

The second portion 5632 is located away from the container 561 in the first direction. The second portion 5632 extends in the second direction from the first portion 5631 toward the development housing 531.

As shown in FIG. 4, the discharge portion 5633 is located away from the first portion 5631 in the second direction. The discharge portion 5633 discharges the toner inside the second portion 5632. The discharge portion 5633 extends in the third direction from the second portion 5632 toward the development housing 531. The discharge portion 5633 has a cylindrical shape. The discharge portion 5633 fits into the reception port 536 of the development unit 53. Thereby, as shown in FIG. 3, the replenishment toner pipe 563 is connected to the center portion of the development housing 531 in the first direction. As shown in FIG. 4, in a state where the cartridge 5 is attached to the main housing 2, the discharge portion 5633 is located above the agitator 535A. The toner in the container 561 passes through the first portion 5631, the second portion 5632 and the discharge portion 5633, and enters the development housing 531.

2.3.4 Auger Screw 564

As shown in FIG. 3, the auger screw 564 conveys the toner in the container 561 in the first direction toward the second portion 5632. The auger screw 564 is located within the first portion 5631. The auger screw 564 extends in the first direction.

2.3.5 Belt Conveyor 565

The belt conveyor 565 conveys the toner from the first portion 5631 toward the discharge portion 5633 in the second direction. The belt conveyor 565 is located within the second portion 5632.

2.4 Seal Member 57

As shown in FIG. 4, the seal member 57 is arranged around the discharge portion 5633. The seal member 57 seals between the discharge portion 5633 and the development housing 531. The seal member 57 is elastically deformable. When the development unit 53 moves relative to the photosensitive drum 51, the seal member 57 elastically deforms between the discharge portion 5633 and the development housing 531 according to the movement of the development unit 53. Thereby, even when the development unit 53 moves relative to the photosensitive drum 51, the seal member 57 seals between the discharge portion 5633 and the development housing 531. As a result, even when the development unit 53 moves relative to the photosensitive drum 51, spilling out of toner from between the discharge portion 5633 and the development housing 531 is suppressed.

2.5 Drum Cleaner 58

As shown in FIG. 3, the drum cleaner 58 is located at the other end of the cartridge 5 in the second direction. The drum cleaner 58 is located between the first drum side plate 551A and the second drum side plate 551B in the first direction. The drum cleaner 58 cleans the circumferential surface of the photosensitive drum 51. The drum cleaner 58 includes a cleaner housing 581 and a cleaning member 582 (see FIG. 4).

The cleaner housing 581 is located between the first drum side plate 551A and the second drum side plate 551B in the first direction. The cleaner housing 581 extends in the first direction. One end of the cleaner housing 581 in the first direction is connected to the first drum side plate 551A. The other end of the cleaner housing 581 in the first direction is connected to the second drum side plate 551B.

As shown in FIG. 4, the cleaner housing 581 has an opening 5811. The cleaner housing 581 contains transfer residual toner.

The cleaning member 582 is attached to the cleaner housing 581. The cleaning member 582 extends in the first direction. The cleaning member 582 has a plate shape. The cleaning member 582 cleans the circumferential surface of the photosensitive drum 51. Specifically, an edge of the cleaning member 582 contacts the circumferential surface of the photosensitive drum 51. When the photosensitive drum 51 rotates, transfer residual toner on the circumferential surface of the photosensitive drum 51 contacts the edge of the cleaning member 582 and is removed from the circumferential surface of the photosensitive drum 51. The transfer residual toner is toner remaining on the circumferential surface of the photosensitive drum 51 without being transferred from the photosensitive drum 51 to the sheet S. The removed residual toner passes through the opening 5811 and is accommodated in the cleaner housing 581.

2.6 Return Toner Pipe 59

As shown in FIGS. 3 and 5, the return toner pipe 59 is attached to the first drum side plate 551A. The return toner pipe 59 is located on the opposite side of the second drum side plate 551B with respect to the first drum side plate 551A in the first direction. The return toner pipe 59 allows passage of toner returning from the cleaner housing 581 to the development housing 531. In other words, the return toner pipe 59 allows passage of toner returning from the photosensitive drum 51 to the development unit 53. The toner returning from the photosensitive drum 51 to the development unit 53 is referred to as return toner. The return toner passes through the return toner pipe 59. One end of the return toner pipe 59 is connected to the drum cleaner 58. The other end of the return toner pipe 59 is connected to the second portion 5632 of the replenishment toner pipe 563.

2.7 Return Toner Conveyor 60

A return toner conveyor 60 is located within the drum cleaner 58 and within the return toner pipe 59. The return toner conveyor 60 conveys the toner in the drum cleaner 58 to the second portion 5632 of the replenishment toner pipe 563. In this embodiment, the return toner conveyor 60 is a shaftless screw.

3. OPERATIONS AND EFFECTS

As shown in FIG. 1, the image forming apparatus 1 includes the replenishment portion 56 configured to replenish toner to the development housing 531. As shown in FIG. 3, the return toner returning from the photosensitive drum 51 to the development unit 53 passes through the return toner pipe 59.

Thus, the return toner is returned to upstream of the flow of the toner replenished to the development housing 531 flowing toward the development roller 532 so that the return toner is mixed with the replenished toner, and then the mixed toner is supplied to the development roller 532.

In other words, the return toner and the replenished toner are mixed before being supplied to the development roller 532.

This resultantly suppresses that the returned toner and the paper dust mixed with the returned toner adversely affect image quality.

In particular, in a case where the charger 52 is a charging roller, transfer residual toner is returned to the development unit 53 via the return toner pipe 59, thereby suppressing that the transfer residual toner, external additive contained in the transfer residual toner, and paper dust adhere to the charging roller.

This resultantly suppresses that the transfer residual toner, the external additive, and the paper dust adhering to the charging roller adversely affect image quality.

This reduces the replacement frequency of the photosensitive drum 51 and the development unit 53, and suppresses an increase in the environmental load.

(2) According to the image forming apparatus 1, as shown in FIG. 3, the return toner pipe 59 is connected to the second portion 5632 of the replenishment toner pipe 563.

Thus, before the toner to be replenished to the development housing 531 enters the development housing 531, the return toner is mixed with the replenished toner. And, the toner is mixed in the development housing 531 before the toner is supplied to the development roller 532.

The replenishment toner pipe 563 is connected to the center portion of the development housing 531 in the first direction.

Thus, the ratio of the return toner to the replenished toner is made uniform in the first direction.

As a result, the influence of the return toner on the image quality is suppressed.

4. MODIFICATION

Next, a modification of the first embodiment will be described with reference to FIGS. 6 to 12. In the following modification, the same reference numerals are assigned to the same members as in the first embodiment, and the description thereof is omitted.

Figure 6:
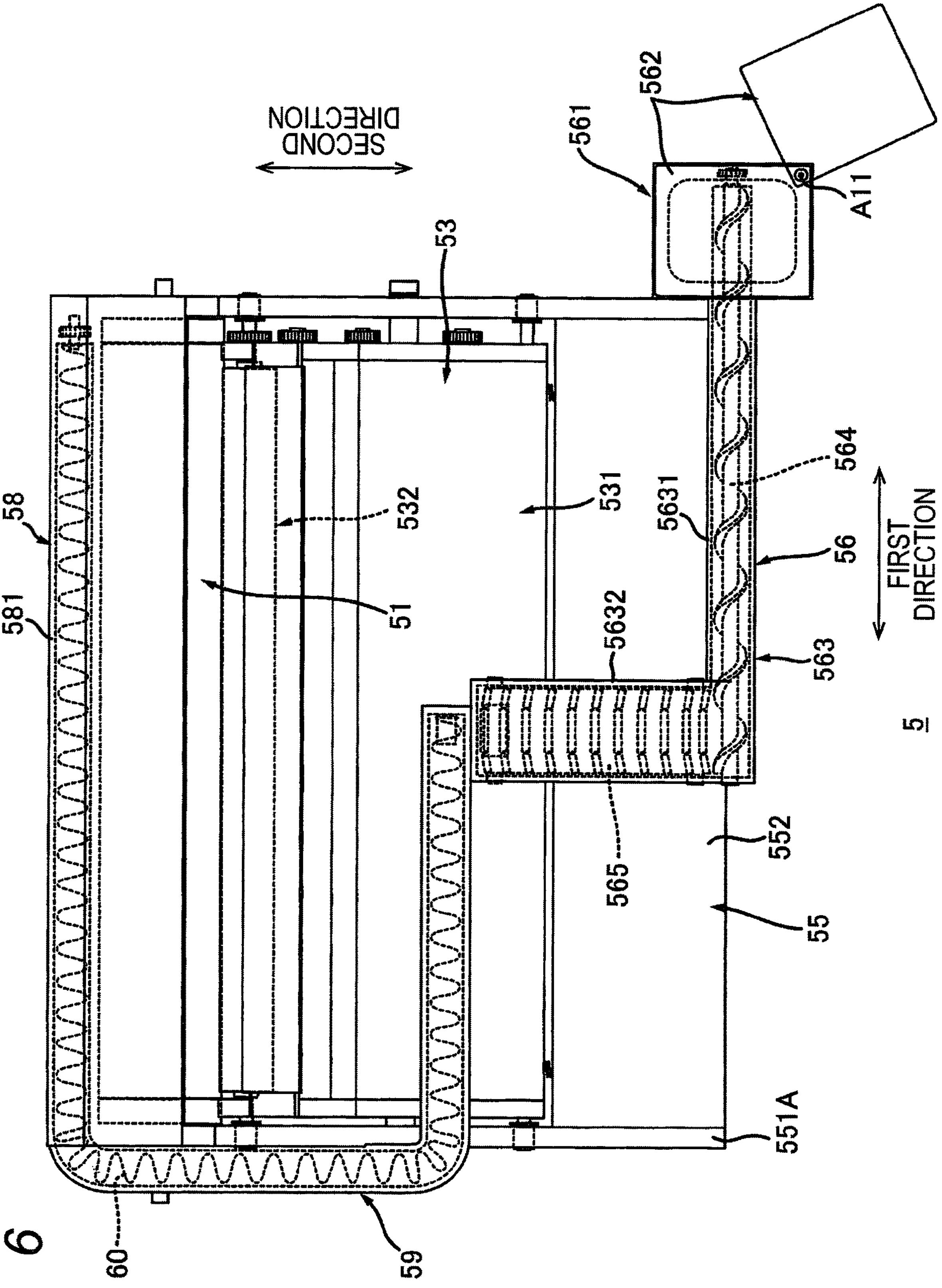
FIG. 6 is a plan view of a cartridge.

(1) As shown in FIG. 6, the return toner pipe 59 does not have to be connected to the replenishment toner pipe 563. The return toner pipe 59 may be connected to the center portion of the development housing 531 in the first direction, independently of the replenishment toner pipe 563. That is, the replenishment toner pipe 563 and the return toner pipe 59 may be connected to the center portion of the development housing 531 in the first direction.

In this modification as well, the return toner supplied from the return toner pipe 59 to the development housing 531 and the toner supplied from the replenishment toner pipe 563 to the development housing 531 are mixed in the development housing 531 before being supplied to the development roller 532.

In addition, the ratio of the return toner to the replenished toner is made uniform in the first direction.

As a result, the influence of the return toner on the image quality is suppressed.

Figure 7:
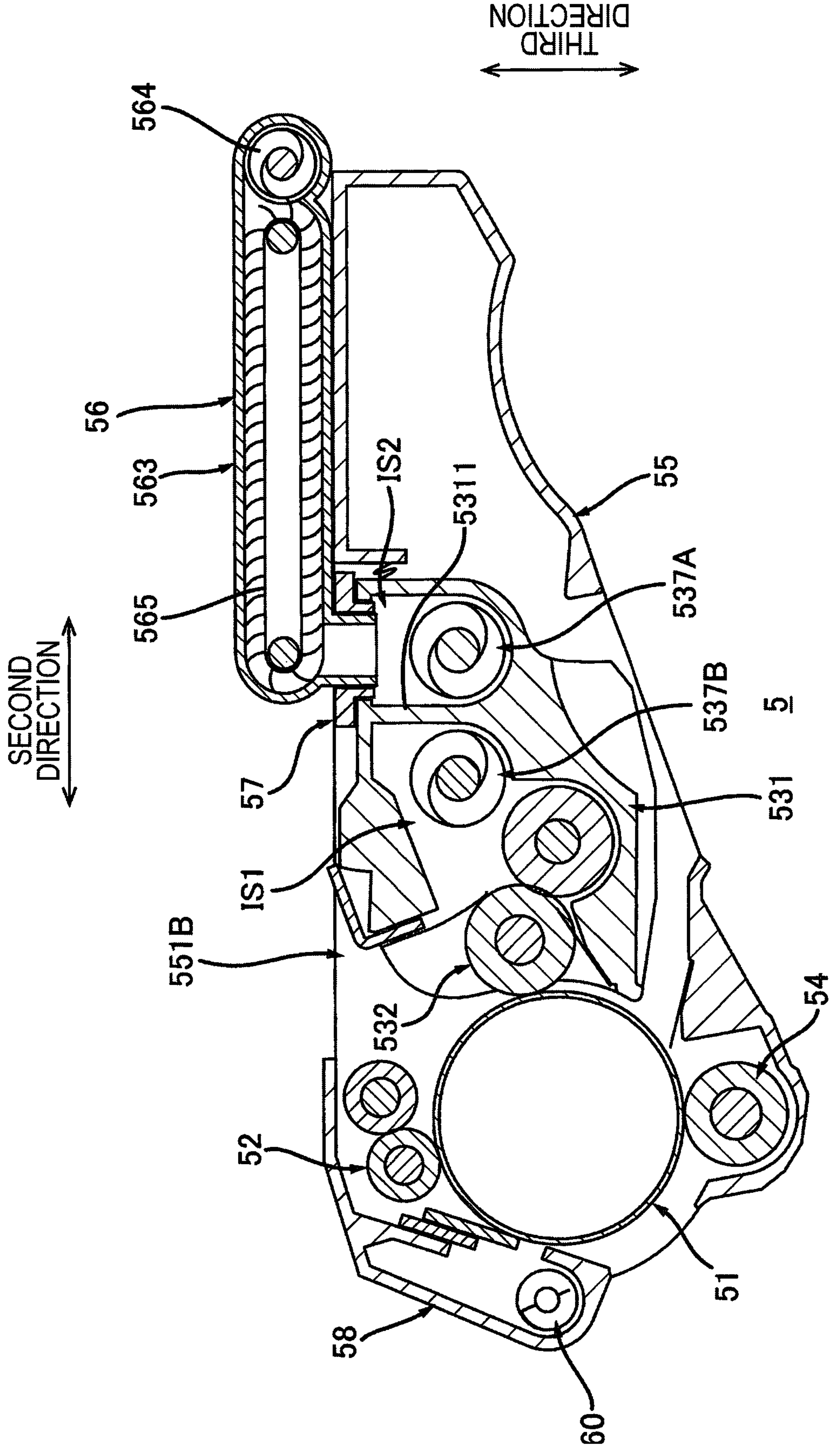
FIG. 7 is a cross-sectional view of a cartridge, taken along a line VII-VII in FIG. 9.

(2) As shown in FIG. 7, the development housing 531 may include a partition wall 5311.

Figure 8:
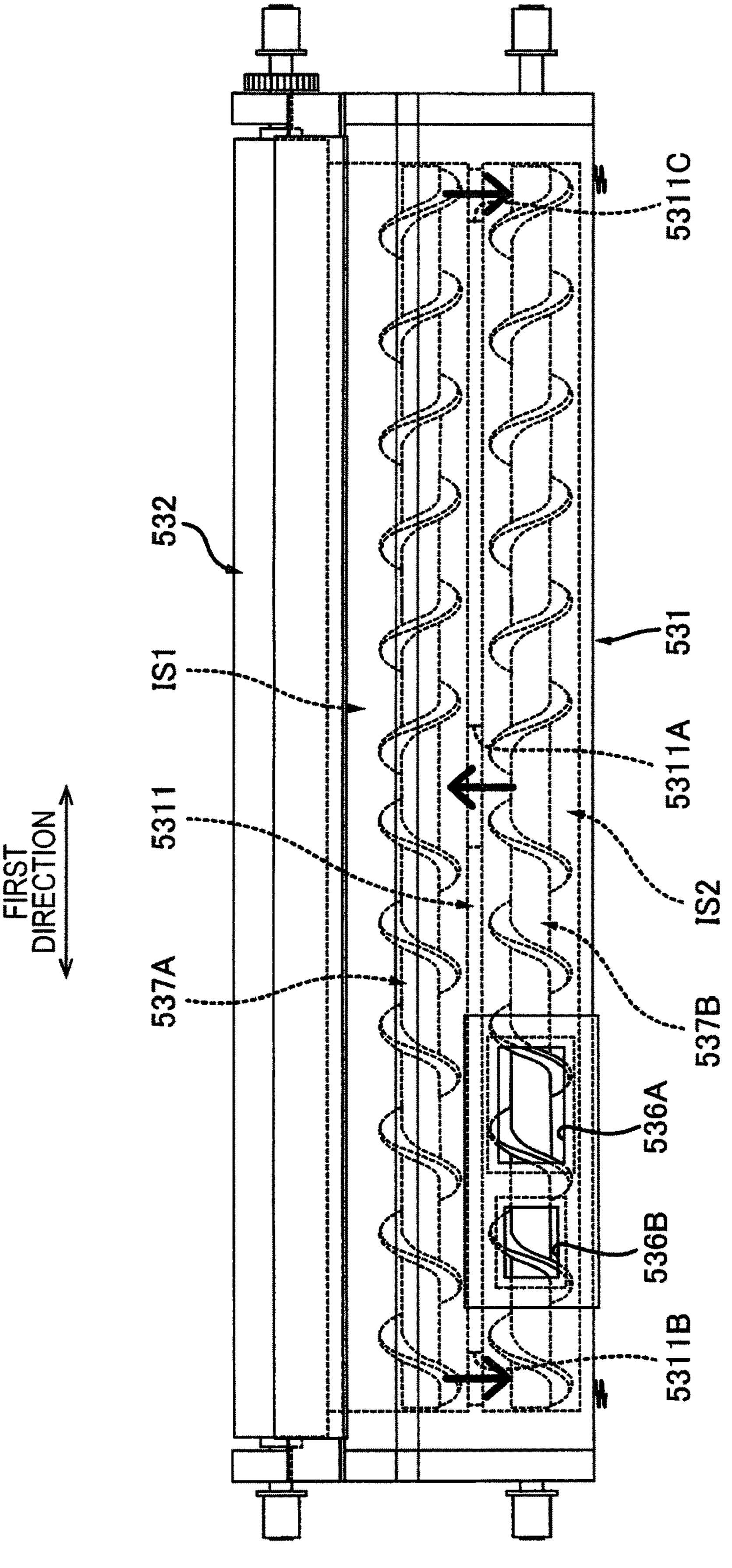
FIG. 8 is a plan view of a development unit of the cartridge.

The partition wall 5311 partitions the internal space of the development housing 531 into a first development chamber IS1 and a second development chamber IS2. The first development chamber IS1 is located between the second development chamber IS2 and the development roller 532 in the second direction. The first development chamber IS1 accommodates part of the development roller 532. In this modification, the development roller 532 supplies the toner in the first development chamber IS1 to the photosensitive drum 51. The partition wall 5311 extends in the first direction and the third direction. As shown in FIG. 8, the partition wall 5311 has a first opening 5311A, a second opening 5311B, and a third opening 5311C.

The first opening 5311A is located in the center portion of the partition wall 5311 in the first direction. The first opening 5311A is located in the center portion of the development housing 531 in the first direction. The first opening 5311A allows passage of toner from the second development chamber IS2 to the first development chamber IS1.

The second opening 5311B is located at one end of the partition wall 5311 in the first direction. The second opening 5311B is located at one end of the development housing 531 in the first direction. The second opening 5311B is located away from the first opening 5311A in the first direction. The second opening 5311B allows passage of toner from the first development chamber IS1 to the second development chamber IS2.

The third opening 5311C is located at the other end of the partition wall 5311 in the first direction. The third opening 5311C is located at the other end of the development housing 531 in the first direction. The third opening 5311C is located away from the first opening 5311A in the first direction. The third opening 5311C allows passage of toner from the first development chamber IS1 to the second development chamber IS2.

In this modification, the development unit 53 does not include the agitators 535A and 535B, but includes a first conveyor 537A and a second conveyor 537B.

The first conveyor 537A is located inside the first development chamber IS1. The first conveyor 537A conveys the toner in the first development chamber IS1 from the first opening 5311A toward the second opening 5311B and from the first opening 5311A toward the third opening 5311C. The first conveyor 537A extends in the first direction. The first conveyor 537A is an auger screw.

The second conveyor 537B is located inside the second development chamber IS2. The second conveyor 537B conveys the toner in the second development chamber IS2 from the second opening 5311B toward the first opening 5311A and from the third opening 5311C toward the first opening 5311A. The second conveyor 537B extends in the first direction. The second conveyor 537B is an auger screw.

Figure 9:
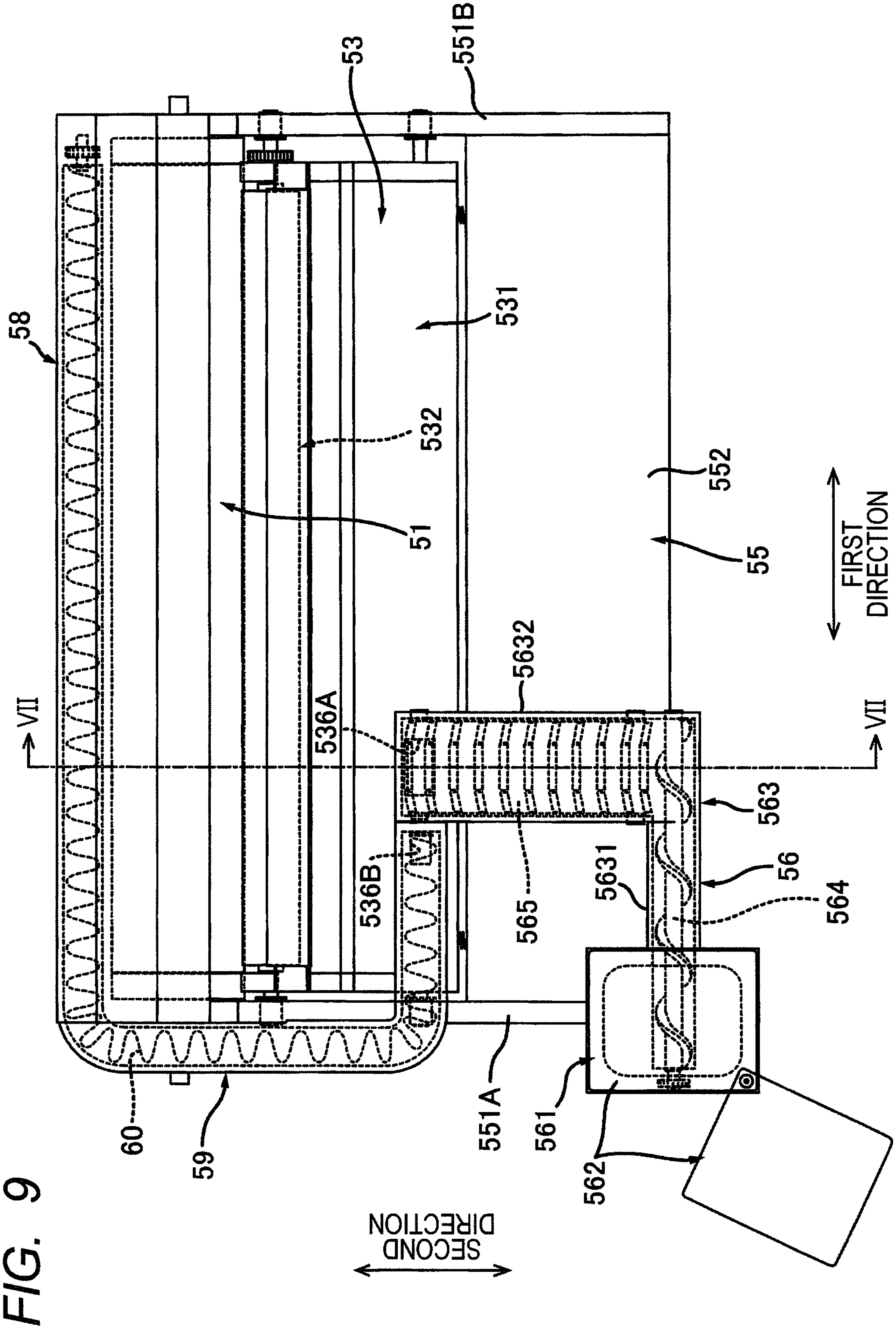
FIG. 9 is a plan view of the cartridge.

In this modification, as shown in FIG. 9, the replenishment toner pipe 563 and the return toner pipe 59 are connected to the second development chamber IS2 (see FIG. 8). Specifically, as shown in FIG. 8, the development housing 531 has a replenishment toner reception port 536A and a return toner reception port 536B.

The replenishment toner reception port 536A is located between the first opening 5311A and the second opening 5311B in the first direction. The replenishment toner reception port 536A communicates with the second development chamber IS2. The replenishment toner pipe 563 (see FIG. 9) is connected to the replenishment toner reception port 536A. The replenishment toner reception port 536A receives the toner from the replenishment toner pipe 563.

The return toner reception port 536B is located between the first opening 5311A and the second opening 5311B in the first direction. The return toner reception port 536B is aligned with the replenishment toner reception port 536A in the first direction. The return toner reception port 536B communicates with the second development chamber IS2. The return toner pipe 59 (see FIG. 9) is connected to the return toner reception port 536B. The return toner reception port 536B receives toner from the return toner pipe 59.

As shown in FIG. 9, in this modification, the container 561 is located on the first drum side plate 551A. Thus, the container 561 is supported by the first drum side plate 551A.

According to this modification, as shown in FIG. 8, the return toner supplied from the return toner pipe 59 to the second development chamber IS2 and the toner supplied from the replenishment toner pipe 563 to the second development chamber IS2 are mixed in the second development chamber IS2, supplied to the first development chamber IS1 through the first opening 5311A, and supplied to the development roller 532 in the first development chamber IS1.

This suppresses the influence of the return toner on the image quality.

Further, the toner in the first development chamber IS1 is returned to the second development chamber IS2 through the second opening 5311B and the third opening 5311C.

Thus, toner is circulated between the first development chamber IS1 and the second development chamber IS2, which suppresses the toner being stagnant in the first development chamber IS1.

Figure 10:
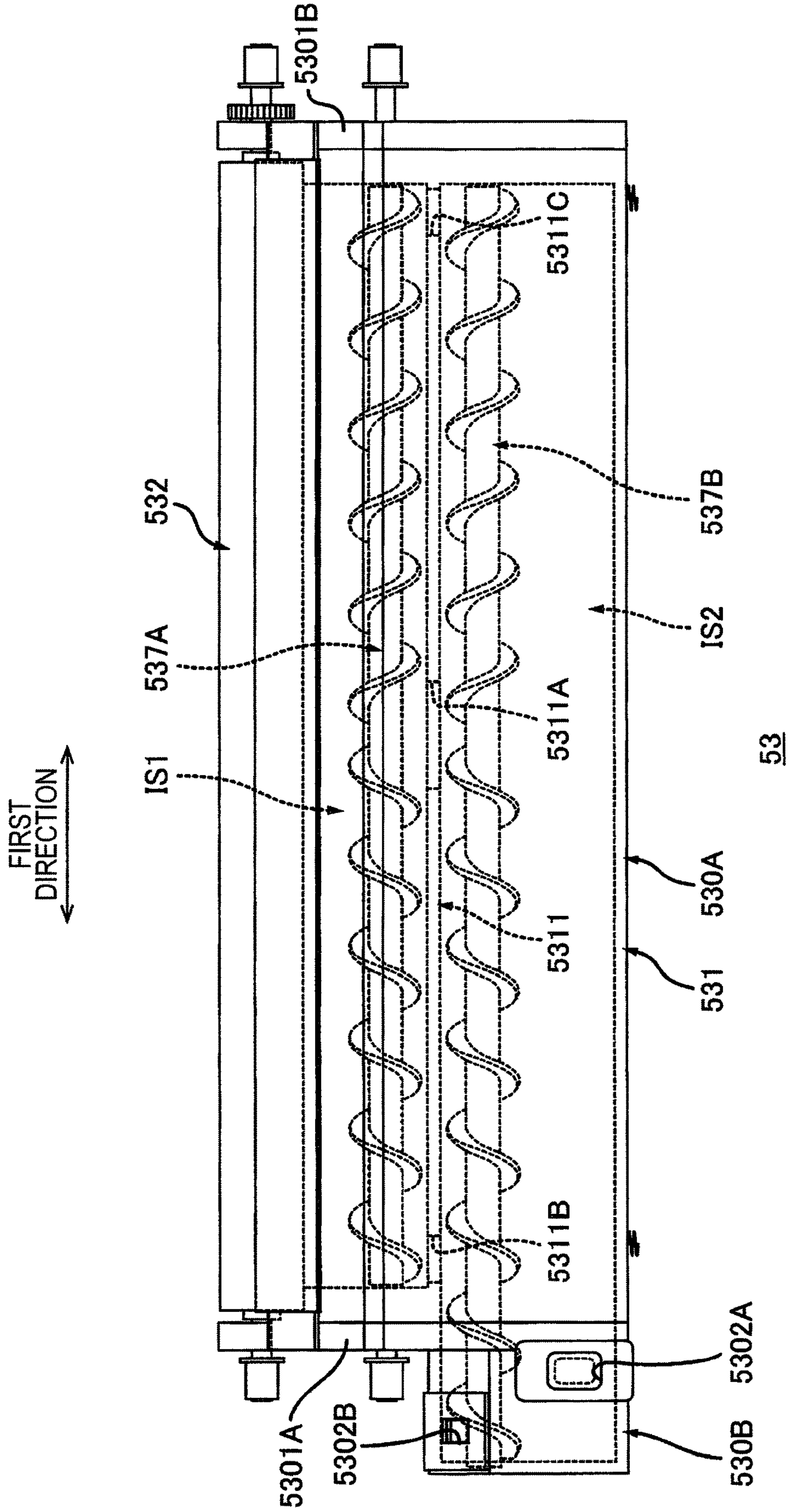
FIG. 10 is a plan view of a development unit of a cartridge.

(3) As shown in FIG. 10, the development housing 531 may include a main body portion 530A and a protruding portion 530B.

Specifically, the main body portion 530A includes a first development side wall 5301A, a second development side wall 5301B, and the partition wall 5311 described above.

The first development side wall 5301A is located at one end of the main body portion 530A in the first direction. The first development side wall 5301A extends in the second direction and the third direction. The first development side wall 5301A supports one end of the development roller 532 in the first direction.

The second development side wall 5301B is located at the other end of the main body portion 530A in the first direction. The second development side wall 5301B extends in the second direction and the third direction. The second development side wall 5301B supports the other end of the development roller 532 in the first direction.

The protruding portion 530B is located on the opposite side of the second development sidewall 5301B with respect to the first development sidewall 5301A in the first direction. The protruding portion 530B protrudes from the first development sidewall 5301A. The protruding portion 530B extends in the first direction. The protruding portion 530B has an internal space communicating with the second development chamber IS2.

Figure 11:
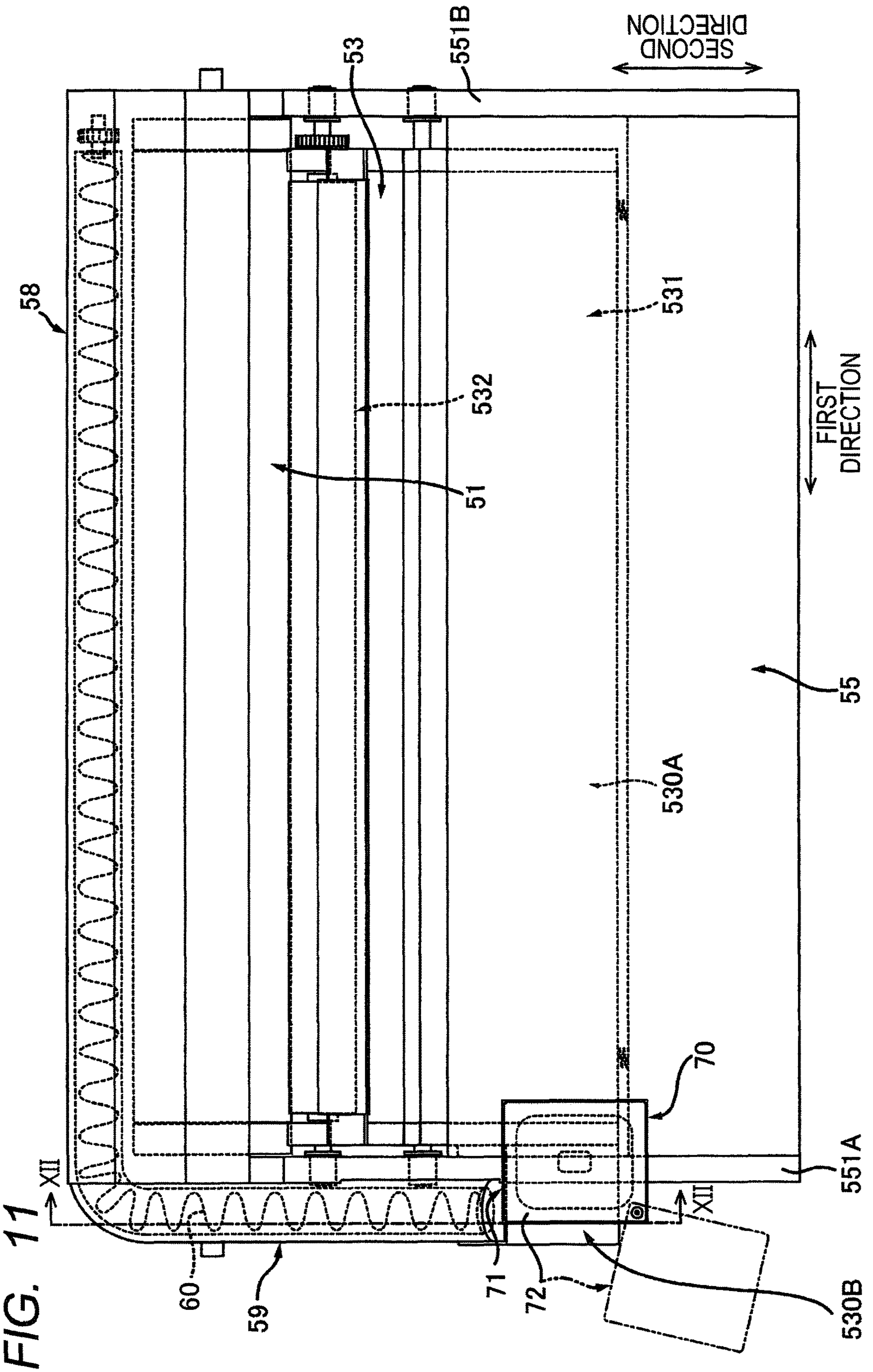
FIG. 11 is a plan view of the cartridge.
Figure 12:
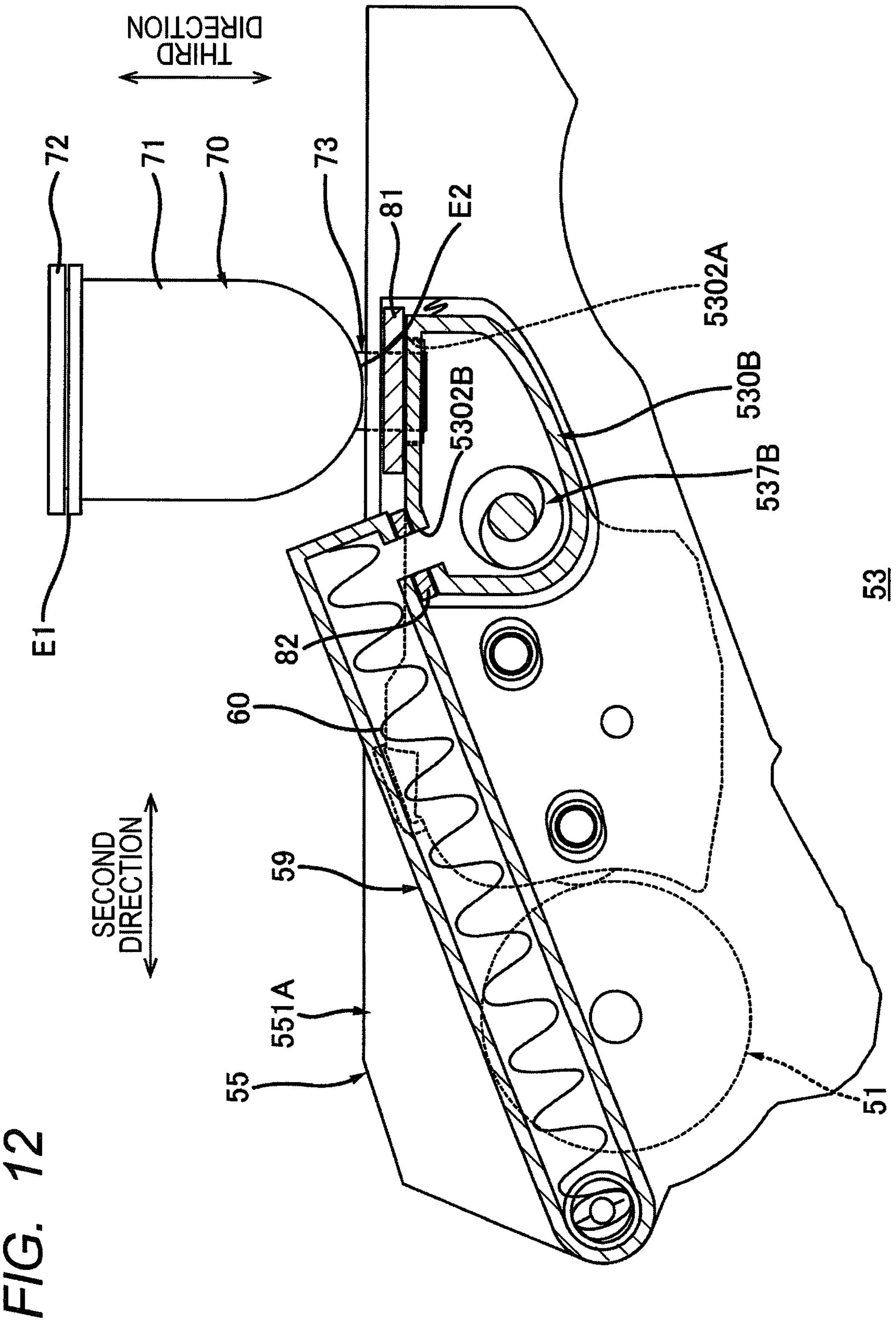
FIG. 12 is a cross-sectional view of the cartridge shown in FIG. 11, taken along a line XII-XII.

In this modification, as shown in FIGS. 11 and 12, the replenishment portion 70 and the return toner pipe 59 are connected to the protruding portion 530B.

Specifically, as shown in FIG. 12, the replenishment portion 70 includes a container 71, a lid 72, a replenishment toner pipe 73, and does not include the auger screw 564 (see FIG. 3) and the belt conveyor 565 (see FIG. 3). The container 71 and the lid 72 are similar to the container 561 and the lid 562 described above, and descriptions thereof are omitted.

The replenishment toner pipe 73 extends from the second end E2 of the container 71 in the third direction. The replenishment toner pipe 73 has a cylindrical shape. In a state where the cartridge 5 is attached to the main housing 2, the toner in the container 71 passes downward through the replenishment toner pipe 73 due to gravity.

The protruding portion 530B has a replenishment toner reception port 5302A and a return toner reception port 5302B.

The replenishment toner reception port 5302A communicates with the internal space of the protruding portion 530B. The replenishment toner pipe 73 is connected to the replenishment toner reception port 5302A. Thus, the toner that has passed through the replenishment toner pipe 73 enters the protruding portion 530B. A seal member 81 is arranged around the replenishment toner reception port 5302A. The seal member 81 is elastically deformable.

The return toner reception port 5302B communicates with the internal space of the protruding portion 530B. The return toner pipe 59 is connected to the return toner reception port 5302B. The return toner reception port 5302B receives toner from the return toner pipe 59. A seal member 82 is arranged around the return toner reception port 5302B. The seal member 82 is elastically deformable.

As shown in FIG. 11, in this modification as well, the container 71 is located on the first drum side plate 551A. Thus, the container 71 is supported by the first drum side plate 551A.

According to this modification, as shown in FIG. 10, the return toner supplied from the return toner pipe 59 to the protruding portion 530B and the toner supplied from the replenishment toner pipe 73 to the protruding portion 530B are mixed in the protruding portion 530B and the second development chamber IS2 of the main body portion 530A, and then supplied to the development roller 532 in the first development chamber IS1.

Thus, the influence of the return toner on the image quality is suppressed.

In this modification as well, the toner in the first development chamber IS1 is returned to the second development chamber IS2 through the second opening 5311B and the third opening 5311C.

Thus, toner is circulated between the first development chamber IS1 and the second development chamber IS2, which suppresses the toner remaining in the first development chamber IS1.

5. SECOND EMBODIMENT

Next, an image forming apparatus 10 according to a second embodiment will be described with reference to FIGS. 13 to 21.

5.1 Outline of Image Forming Apparatus 10

An outline of the image forming apparatus 10 will be described with reference to FIGS. 13 to 15.

Figure 13:
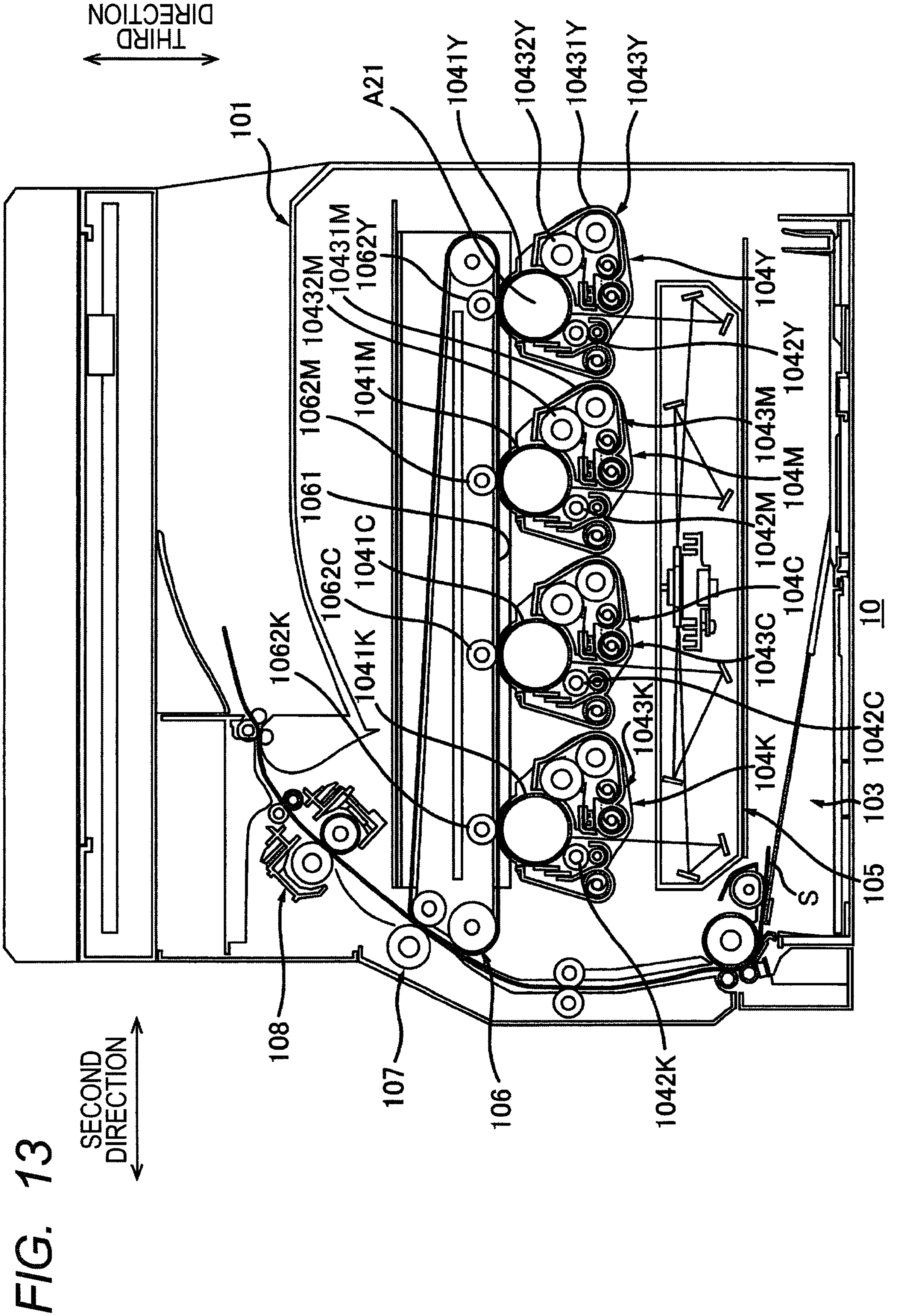
FIG. 13 is a diagram showing a schematic configuration of an image forming apparatus.

As shown in FIG. 13, the image forming apparatus 10 is an image forming apparatus capable of multicolor printing. The image forming apparatus 10 includes a main housing 101, a cover 102 (see FIG. 14), a sheet storage portion 103, a plurality of cartridges 104Y, 104M, 104C and 104K, an exposure device 105, an intermediate transfer unit 106, a transfer roller 107, and a fuser 108.

5.1.1 Main Housing 101

The main housing 101 accommodates the sheet storage portion 103, the cartridges 104Y, 104M, 104C and 104K, the exposure device 105, the intermediate transfer unit 106, the transfer roller 107, and the fuser 108.

Figure 14:
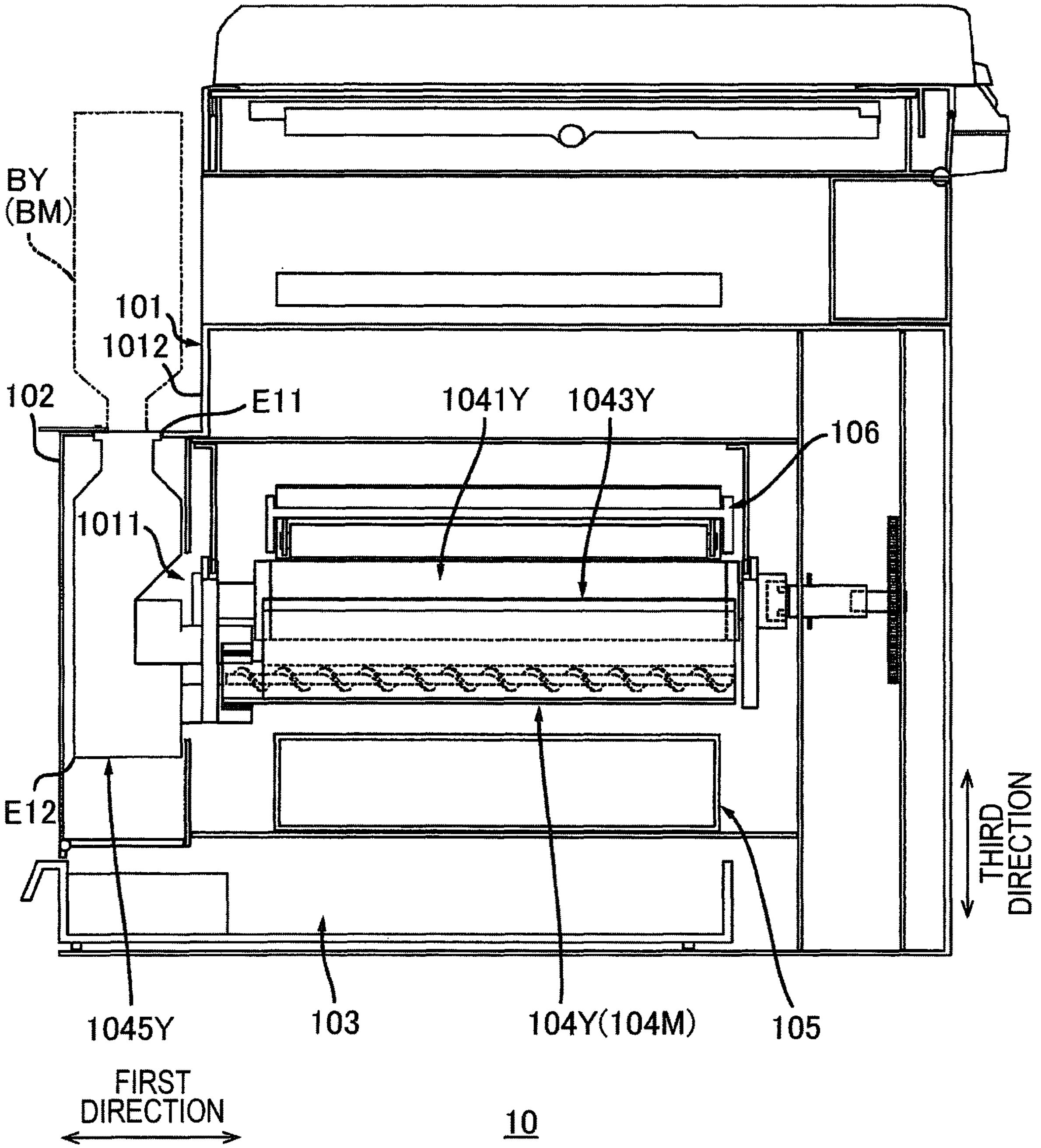
FIG. 14 is an explanatory diagram for explaining attachment and detachment of a cartridge shown in FIG. 13, and shows a state where the cartridge is attached to a main housing and a cover is located at a closed position.

As shown in FIG. 14, the main housing 101 has a main opening 1011. The main opening 1011 is located at one end of the main housing 101 in the first direction. Specifically, the main housing 101 includes a side wall 1012 on one side in the first direction. The side wall 1012 has the main opening 1011.

5.1.2 Cover 102

Figure 15:
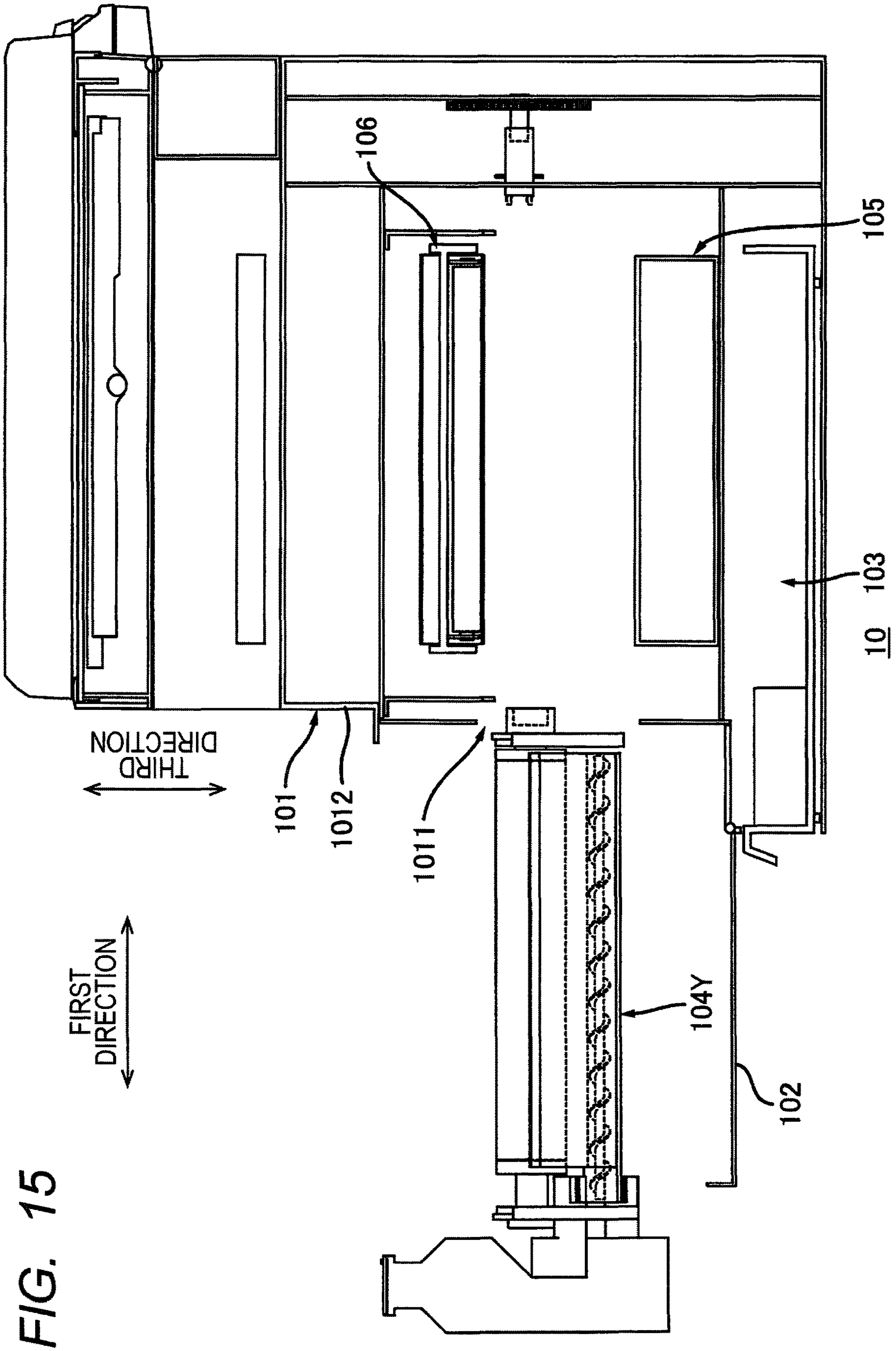
FIG. 15 is an explanatory diagram for explaining attachment and detachment of the cartridge shown in FIG. 13, showing a state where the cover is located at an open position and the cartridge is removed from the main housing.

As shown in FIGS. 14 and 15, the cover 102 is movable between a closed position (see FIG. 14) and an open position (see FIG. 15). As shown in FIG. 14, the cover 102 closes the main opening 1011 in a state where the cover 102 is located at the closed position. As shown in FIG. 15, the main opening 1011 is opened in a state where the cover 102 is located at the open position.

5.1.3 Sheet Storage Portion 103

As shown in FIG. 13, the sheet storage portion 103 stores sheets S therein. The sheet S in the sheet storage portion 103 is conveyed toward the transfer roller 107.

5.1.4 Cartridges 104Y, 104M, 104C, 104K

The cartridges 104Y, 104M, 104C, 104K are aligned in the second direction. Each of cartridges 104Y, 104M, 104C and 104K has the same structure. Thus, in the following description, the cartridge 104Y will be described, and the description of each of the cartridges 104M, 104C, and 104K will be omitted.

In the second embodiment, as shown in FIG. 15, in a state where the cover 102 is located at the cover open position, the cartridge 104Y is attached to and detachable from the main housing 101 through the main opening 1011 in the first direction. That is, the main opening 1011 allows passage of the cartridge 104Y.

As shown in FIG. 13, the cartridge 104Y includes a photosensitive drum 1041Y, a charger 1042Y, and a development unit 1043Y. In other words, the image forming apparatus includes the photosensitive drum 1041Y.

5.1.4.1 Photosensitive Drum 1041Y

The photosensitive drum 1041Y has the same structure as the photosensitive drum 51 of the first embodiment. Thus, description of the photosensitive drum 1041Y is omitted.

5.1.4.2 Charger 1042Y

The charger 1042Y charges the photosensitive drum 1041Y. The charger 1042Y is a charging roller. The cartridge 104Y may include a scorotron charger instead of the charger 1042Y.

5.1.4.3 Development Unit 1043Y

The development unit 1043Y supplies toner to the photosensitive drum 1041Y. The development unit 1043Y includes a development housing 10431Y and a development roller 10432Y. In other words, the image forming apparatus 1 includes the development housing 10431Y and the development roller 10432Y. Further, the cartridge 104Y includes the development housing 10431Y and the development roller 10432Y.

The development housing 10431Y supports the development roller 10432Y. The development housing 10431Y contains toner.

The development roller 10432Y supplies the toner in the development housing 10431Y to the photosensitive drum 1041Y. The development roller 10432Y contacts the photosensitive drum 1041Y. The development roller 10432Y may be separatable from the photosensitive drum 1041Y. The development roller 10432Y has the same structure as the development roller 532 of the first embodiment. Thus, description of the development roller 10432Y is omitted.

5.1.5 Exposure Device 105

As shown in FIG. 13, in a state where the image forming apparatus 1 is placed on a horizontal surface and the cartridges 104Y, 104M, 104C, and 104K are attached to the main housing 101, the exposure device 105 is located below the cartridges 104Y, 104M, 104C and 104K. In a state where the cartridges 104Y, 104M, 104C, and 104K are attached to the main housing 101, the exposure device 105 exposes the circumferential surface of the photosensitive drum 1041Y charged by the charger 1042Y, the circumferential surface of the photosensitive drum 1041M charged by the charger 1042M, the circumferential surface of the photosensitive drum 1041C charged by the charger 1042C, and the circumferential surface of the photosensitive drum 1041K charged by the charger 1042K. In this embodiment, the exposure device 105 is a laser scanning unit. The exposure device 105 may be an LED head.

The development unit 1043Y supplies toner to the exposed circumferential surface of the photosensitive drum 1041Y. The development unit 1043M supplies toner to the exposed circumferential surface of the photosensitive drum 1041M. The development unit 1043C supplies toner to the exposed circumferential surface of the photosensitive drum 1041C. The development unit 1043K supplies toner to the exposed circumferential surface of the photosensitive drum 1041K.

5.1.6 Intermediate Transfer Unit 106

In a state where the cartridges 104Y, 104M, 104C and 104K are attached to the main housing 101, the intermediate transfer unit 106 is located above the cartridges 104Y, 104M, 104C and 104K. The intermediate transfer unit 106 includes an intermediate transfer belt 1061 and transfer rollers 1062Y, 1062M, 1062C and 1062K.

In a state where the cartridges 104Y, 104M, 104C and 104K are attached to the image forming apparatus 10, the intermediate transfer belt 1061 contacts the photosensitive drums 1041Y, 1041M, 1041C and 1041K.

The transfer roller 1062Y transfers the toner on the photosensitive drum 1041Y to the intermediate transfer belt 1061. The transfer roller 1062M transfers the toner on the photosensitive drum 1041M to the intermediate transfer belt 1061. The transfer roller 1062C transfers the toner on the photosensitive drum 1041C to the intermediate transfer belt 1061. The transfer roller 1062K transfers the toner on the photosensitive drum 1041K to the intermediate transfer belt 1061.

5.1.7 Transfer Roller 107

The transfer roller 107 transfers the toner on the intermediate transfer belt 1061 to the sheet S. Specifically, the sheet S conveyed from the sheet storage portion 103 toward the transfer roller 107 passes between the transfer roller 107 and the intermediate transfer belt 1061 and is conveyed to the fuser 108. At this time, the transfer roller 107 transfers the toner on the intermediate transfer belt 1061 to the sheet S.

5.1.8 Fuser 108

The fuser 108 heats and pressurizes the sheet S on which toner is transferred to fix the toner on the sheet S. The sheet S that has passed through the fuser 108 is discharged to the upper surface of the main housing 101.

5.2 Details of Cartridge 104Y

Next, details of the cartridge 104Y will be described with reference to FIGS. 16 to 21. In the following description of the cartridge 104Y, the "first direction" and the "third direction" are the first direction and the third direction in a state where the cartridge 104Y is attached to the main housing 101.

Figure 16:
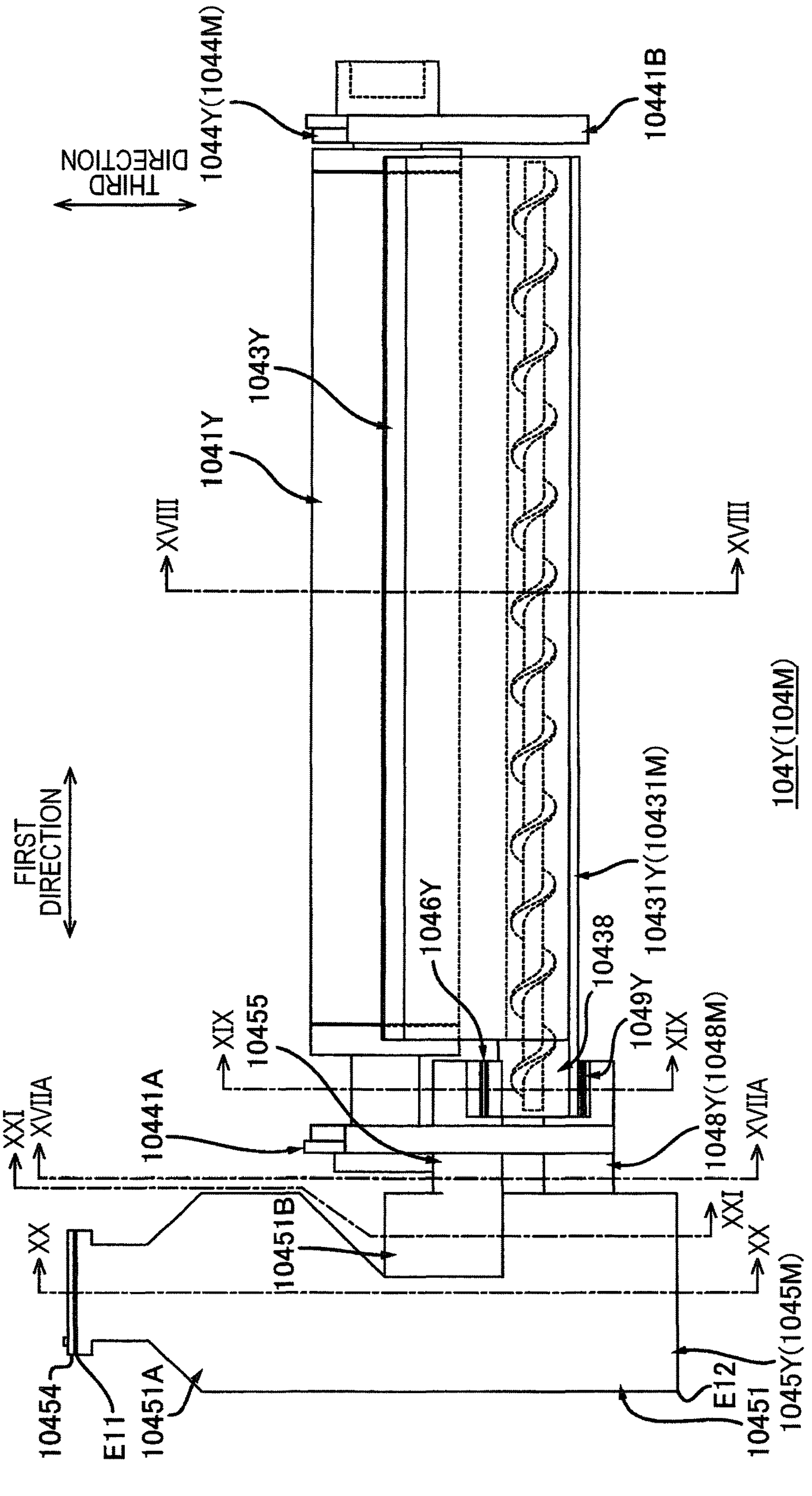
FIG. 16 is a side view of the cartridge shown in FIG. 13, viewed from a second direction.

As shown in FIG. 16, the cartridge 104Y includes a drum frame 1044Y, a replenishment portion 1045Y, a seal member 1046Y (see FIG. 19), a drum cleaner 1047Y (see FIG. 18), a return toner pipe 1048Y, a seal member 1049Y (see FIG. 19), and a return toner conveyor 1050Y (see FIG. 19), in addition to the photosensitive drum 1041Y, the charger 1042Y, and the development unit 1043Y described above. In other words, the image forming apparatus 10 includes the drum frame 1044Y and the return toner pipe 1048Y.

5.2.1 Drum Frame 1044Y

As shown in FIG. 16, the drum frame 1044Y supports the photosensitive drum 1041Y, the charger 1042Y, the development unit 1043Y, the replenishment portion 1045Y, the drum cleaner 1047Y, and the return toner pipe 1048Y. The drum frame 1044Y includes a first drum side plate 10441A and a second drum side plate 10441B.

5.2.1.1 First Drum Side Plate 10441A

Figure 17A:
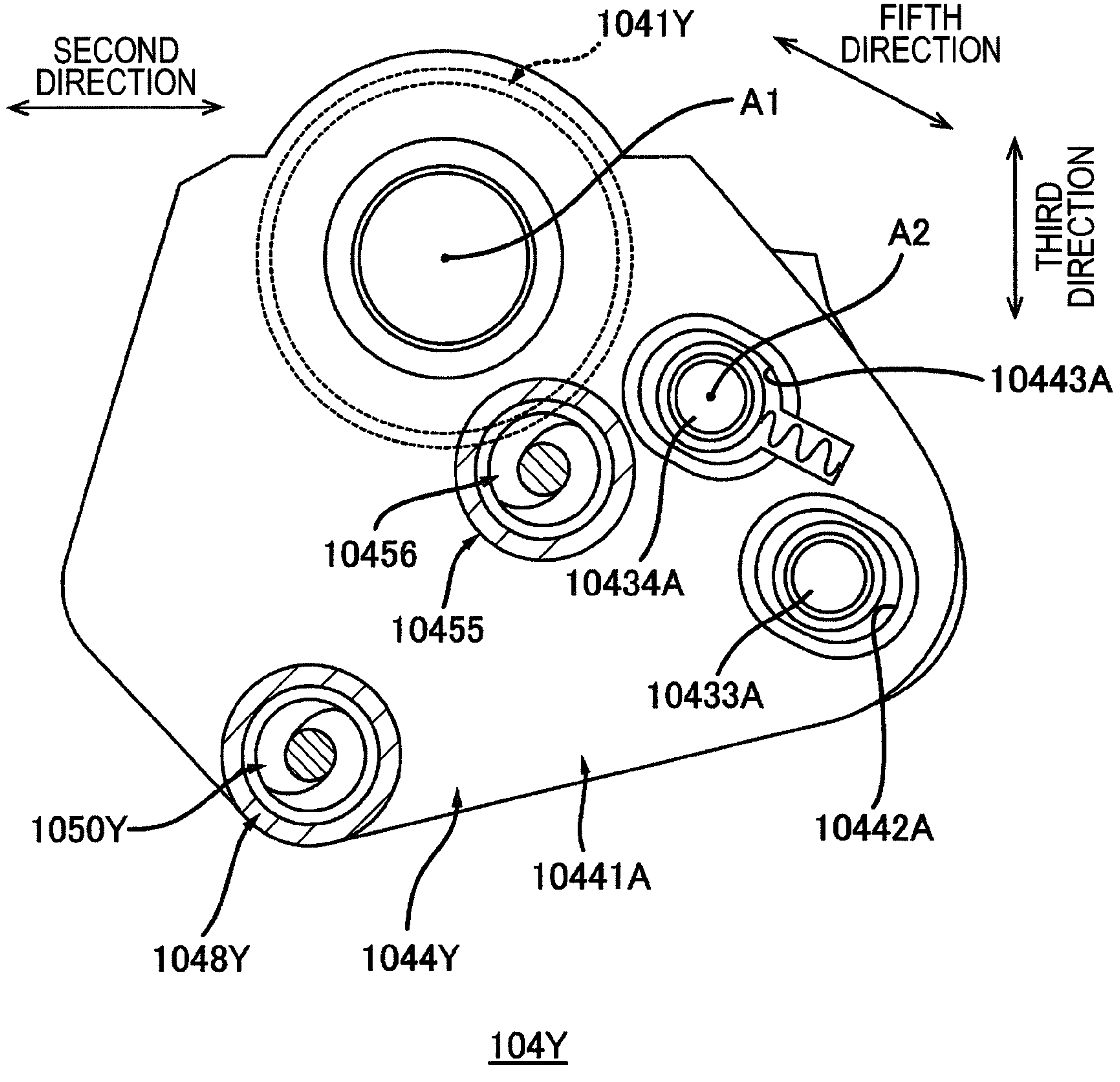
FIG. 17A is a cross-sectional view of the cartridge shown in FIG. 16, taken along a line XVIIA-XVIIA.

The first drum side plate 10441A is located at one end of the drum frame 1044Y in the first direction. The first drum side plate 10441A extends in a direction crossing the first direction. The first drum side plate 10441A may extend in a direction perpendicular to the first direction. The first drum side plate 10441A supports one end of the photosensitive drum 1041Y in the first direction. As shown in FIG. 17A, the first drum side plate 10441A has two through holes 10442A and 10443A.

The through hole 10442A is located away from the photosensitive drum 1041Y in a fifth direction. The fifth direction is the direction connecting the drum axis A1 and the development axis A2. The through hole 10442A extends in the fifth direction. The through hole 10442A is an elongated hole.

The through hole 10443A is located between the through hole 10442A and the photosensitive drum 1041Y in the fifth direction. The through hole 10443A is located away from the through hole 10442A in the fifth direction. The through hole 10443A extends in the fifth direction. The through hole 10443A is an elongated hole.

5.2.1.2 Second Drum Side Plate 10441B

Figure 17B:
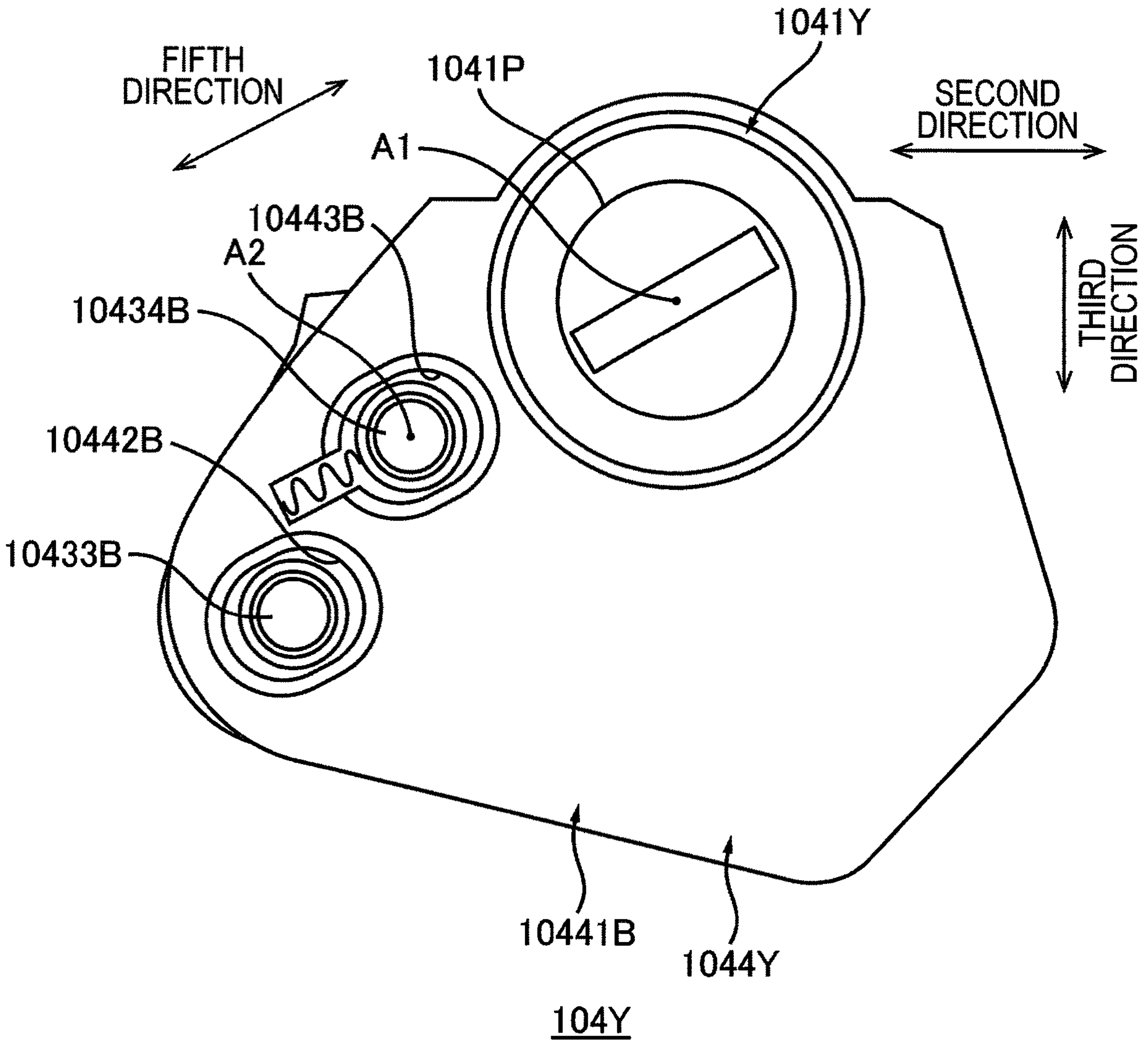
FIG. 17B is a side view of the cartridge shown in FIG. 13, viewed from another side in a first direction.

As shown in FIG. 16, the second drum side plate 10441B is located at the other end of the drum frame 1044Y in the first direction. The second drum side plate 10441B extends in a direction crossing the first direction. The second drum side plate 10441B may extend in a direction perpendicular to the first direction. The second drum side plate 10441B supports the other end of the photosensitive drum 1041Y in the first direction. As shown in FIG. 17B, the second drum side plate 10441B has two through holes 10442B and 10443B, like the first drum side plate 10441A. As shown in FIG. 17B, a coupling 1041P for driving the photosensitive drum 1041Y is provided at the other end of the photosensitive drum 1041Y in the first direction.

The through hole 10442B is located away from the photosensitive drum 1041Y in the fifth direction. The through hole 10442B extends in the fifth direction. The through hole 10442B is an elongated hole.

The through hole 10443B is located between the through hole 10442B and the photosensitive drum 1041Y in the fifth direction. The through hole 10443B is located away from the through hole 10442B in the fifth direction. The through hole 10443B extends in the fifth direction. The through hole 10443B is an elongated hole.

5.2.2 Details of Development Unit 1043Y

As shown in FIG. 16, the development unit 1043Y is located between the first drum side plate 10441A and the second drum side plate 10441B in the first direction. Specifically, the development housing 10431Y is located between the first drum side plate 10441A and the second drum side plate 10441B.

Figure 19:
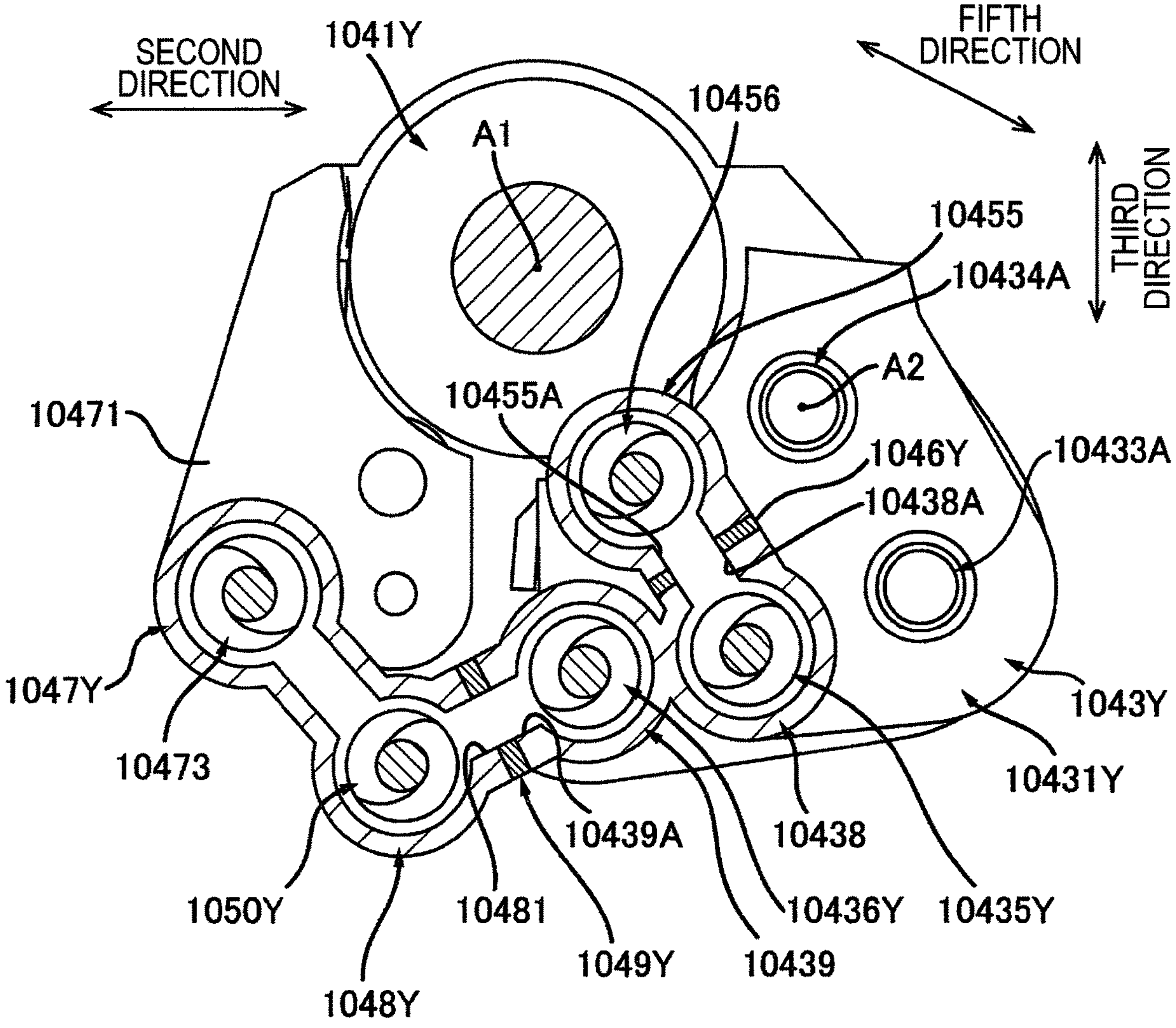
FIG. 19 is a cross-sectional view of the cartridge shown in FIG. 16, taken along a line XIX-XIX.

As shown in FIG. 19, the development unit 1043Y includes two protrusions 10433A and 10434A, two protrusions 10433B and 10434B (see FIG. 17B), a first conveyor 10435Y and a second conveyor 10436Y, in addition to the development housing 10431Y and the development roller 10432Y described above.

5.2.2.1 Details of Development Housing 10431Y

As shown in FIG. 16, the development housing 10431Y extends in the first direction. The development housing 10431Y includes a partition wall 10437 (see FIG. 18), a reception portion 10438 (see FIG. 19), and a discharge portion 10439 (see FIG. 19).

Figure 18:
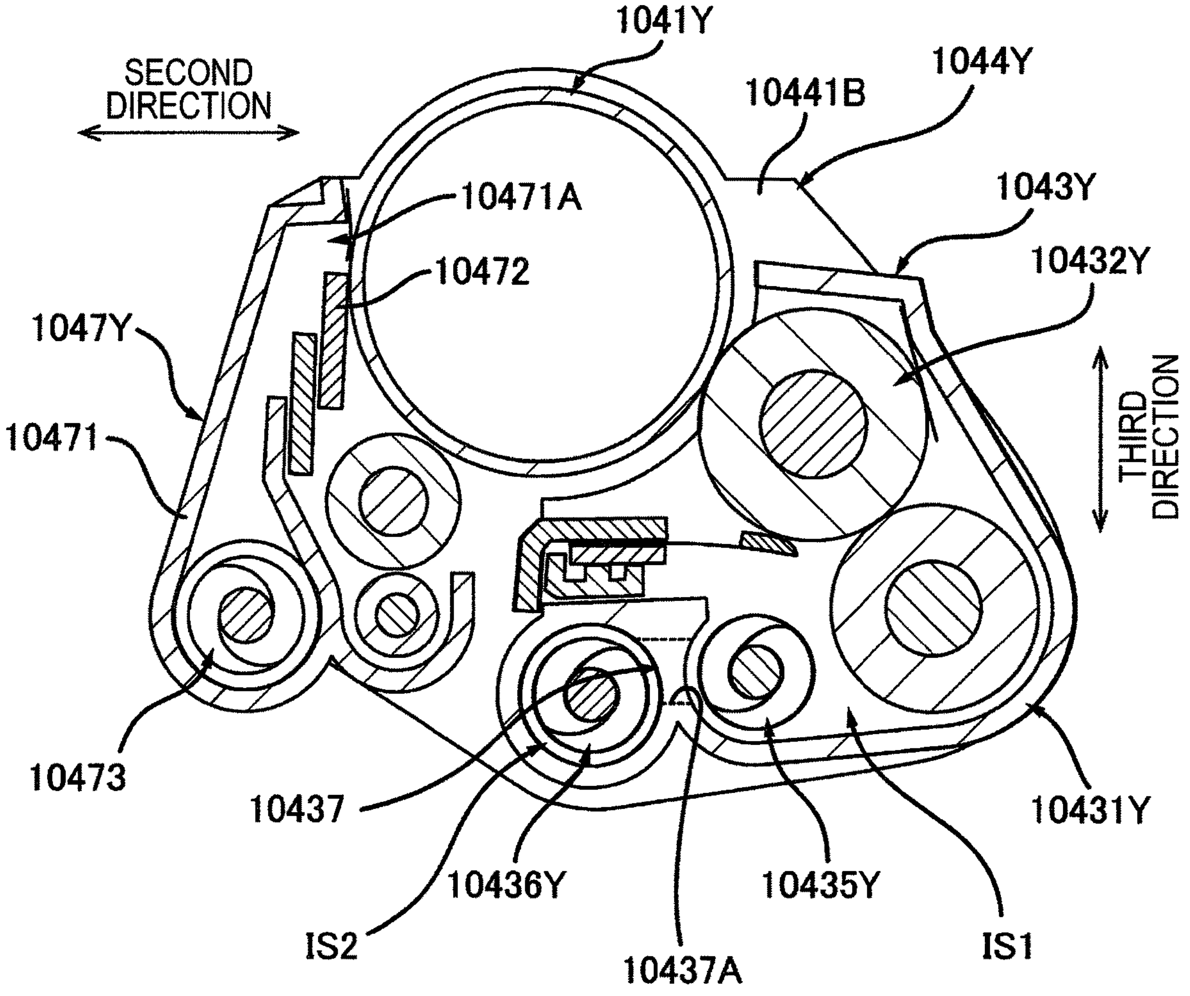
FIG. 18 is a cross-sectional view of the cartridge shown in FIG. 16, taken along a line XVIII-XVIII.

As shown in FIG. 18, the partition wall 10437 partitions the internal space of the development housing 10431Y into a first development chamber IS1 and a second development chamber IS2. The first development chamber IS1 accommodates part of the development roller 10432Y. The partition wall 10437 has a passage 10437A. The passage 10437A allows communication between the first development chamber IS1 and the second development chamber IS2. The passage 10437A is located at the other end of partition wall 10437 in the first direction.

As shown in FIG. 16, the reception portion 10438 is located at one end of the development housing 10431Y in the first direction. The reception portion 10438 extends in the first direction. The reception portion 10438 has a cylindrical shape. The internal space of the reception portion 10438 communicates with the first development chamber IS1 (see FIG. 18). As shown in FIG. 19, the reception portion 10438 has a reception port 10438A. That is, the development housing 10431Y has the reception port 10438A.

The reception port 10438A receives toner discharged from a discharge port 10455A (see FIG. 19) of the replenishment toner pipe 10455. The discharge port 10455A will be described later.

The discharge portion 10439 is located at one end of the development housing 10431Y in the first direction. The discharge portion 10439 extends in the first direction. The discharge portion 10439 has a cylindrical shape. The internal space of the discharge section 10439 communicates with the second development chamber IS2 (see FIG. 18). The discharge portion 10439 has a discharge port 10439A. In other words, the development housing 10431Y has the discharge port 10439A.

The discharge port 10439A discharges the toner from the second development chamber IS2.

5.2.2.2 Protrusions 10433A and 10434A

The protrusion 10433A is located away from the photosensitive drum 1041Y in the fifth direction. The protrusion 10433A is located at one end of the development unit 1043Y in the first direction. The protrusion 10433A extends in the first direction. In this embodiment, the protrusion 10433A extends from an outer surface of the development housing 10431Y on one side in the first direction. The protrusion 10433A may be attached to the outer surface of the development housing 10431Y on one side in the first direction. The protrusion 10433A has a cylindrical shape. The protrusion 10433A fits into the through hole 10442A (see FIG. 17A) of the first drum side plate 10441A.

The protrusion 10434A is located between the photosensitive drum 1041Y and the protrusion 10433A in the fifth direction. The protrusion 10434A is located at one end of the development unit 1043Y in the first direction. The protrusion 10434A extends in the first direction. In this embodiment, the protrusion 10434A is one end of the shaft of the development roller 10432Y in the first direction. The protrusion 10434A may extend from an outer surface of the development housing 10431Y on one side in the first direction. The protrusion 10434A may be attached to the outer surface of the development housing 10431Y on one side in the first direction. The protrusion 10434A has a cylindrical shape. The protrusion 10434A fits into the through hole 10443A (see FIG. 17A) of the first drum side plate 10441A.

5.2.2.3 Protrusions 10433B and 10434B

The protrusion 10433B is located at the other end of the development unit 1043Y in the first direction. The protrusion 10433B fits into the through hole 10442B (see FIG. 17B) of the second drum side plate 10441B (see FIG. 16). A description of the protrusion 10433B is omitted because it is the same as the description of the protrusion 10433A.

The protrusion 10434B is located at the other end of the development unit 1043Y in the first direction. The protrusion 10434B fits into the through hole 10443B (see FIG. 17B) of the second drum side plate 10441B (see FIG. 16). A description of the protrusion 10434B is omitted because it is the same as the description of the protrusion 10434A.

The protrusion 10433A fits into the through hole 10442A, the protrusion 10434A fits into the through hole 10443A, the protrusion 10433B fits into the through hole 10442B, and the protrusion 10434B fits into the through hole 10443B, whereby the development unit 1043Y is supported by the drum frame 1044Y. The development unit 1043Y is movable in the fifth direction relative to the photosensitive drum 1041Y.

5.2.2.4 First Conveyor 10435Y

As shown in FIG. 18, the first conveyor 10435Y is located inside the first development chamber IS1 of the development housing 10431Y. The first conveyor 10435Y conveys toner from the reception port 10438A (see FIG. 19) toward the passage 10437A. The first conveyor 10435Y extends in the first direction. The first conveyor 10435Y is an auger screw.

5.2.2.5 Second Conveyor 10436Y

The second conveyor 10436Y is located inside the second development chamber IS2 of the development housing 10431Y. The second conveyor 10436Y conveys the toner from the passage 10437A toward the discharge port 10439A (see FIG. 19). That is, the second conveyor 10436Y conveys the toner inside the development housing 10431Y toward the discharge port 10439A. The second conveyor 10436Y extends in the first direction. The second conveyor 10436Y is an auger screw.

5.2.3 Replenishment Portion 1045Y

As shown in FIG. 14, the replenishment portion 1045Y is connectable to a toner container BY. The replenishment portion 1045Y replenishes toner from the toner container BY to the development unit 1043Y.

Figure 20:
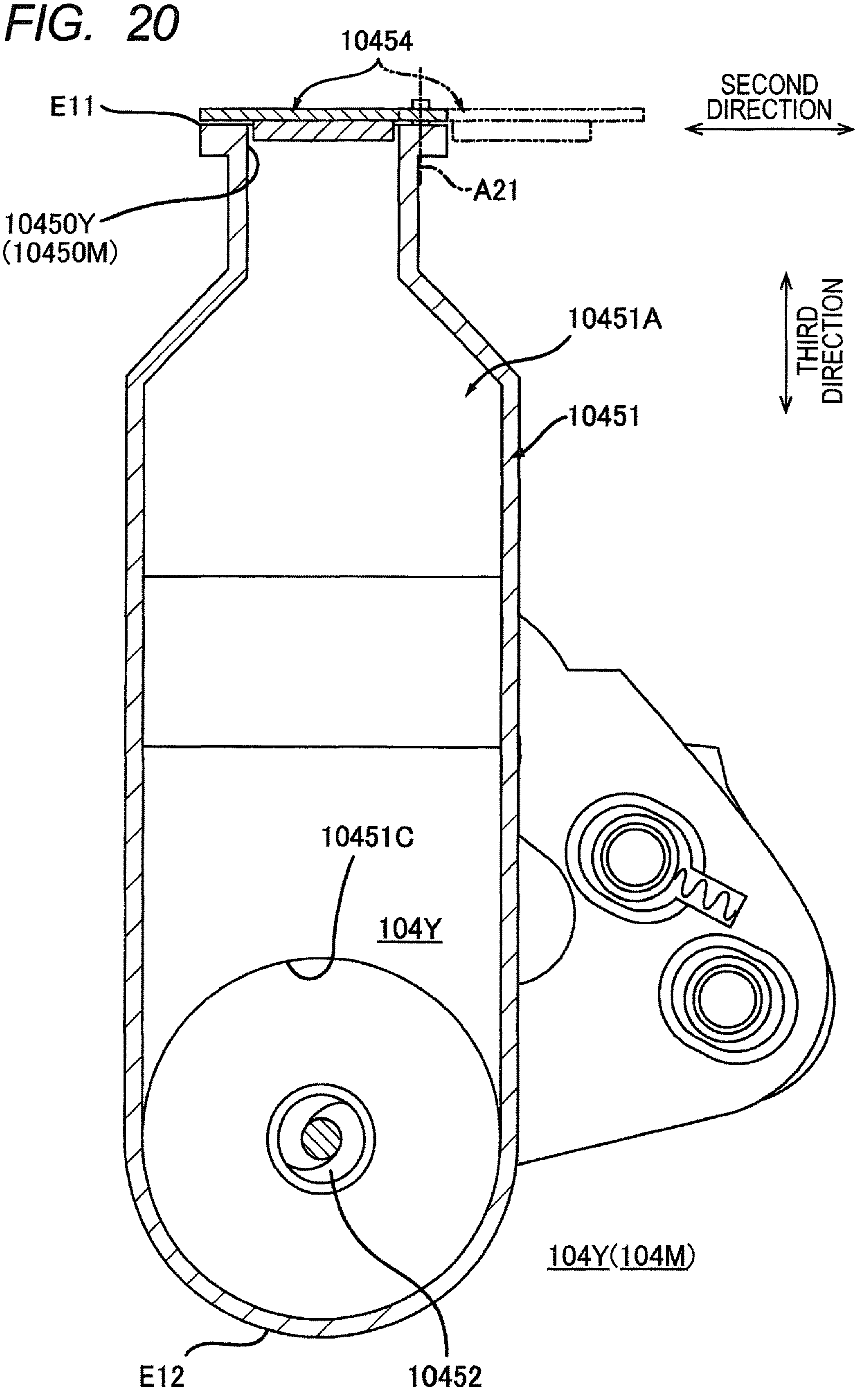
FIG. 20 is a cross-sectional view of the cartridge shown in FIG. 16, taken along a line XX-XX.
Figure 21:
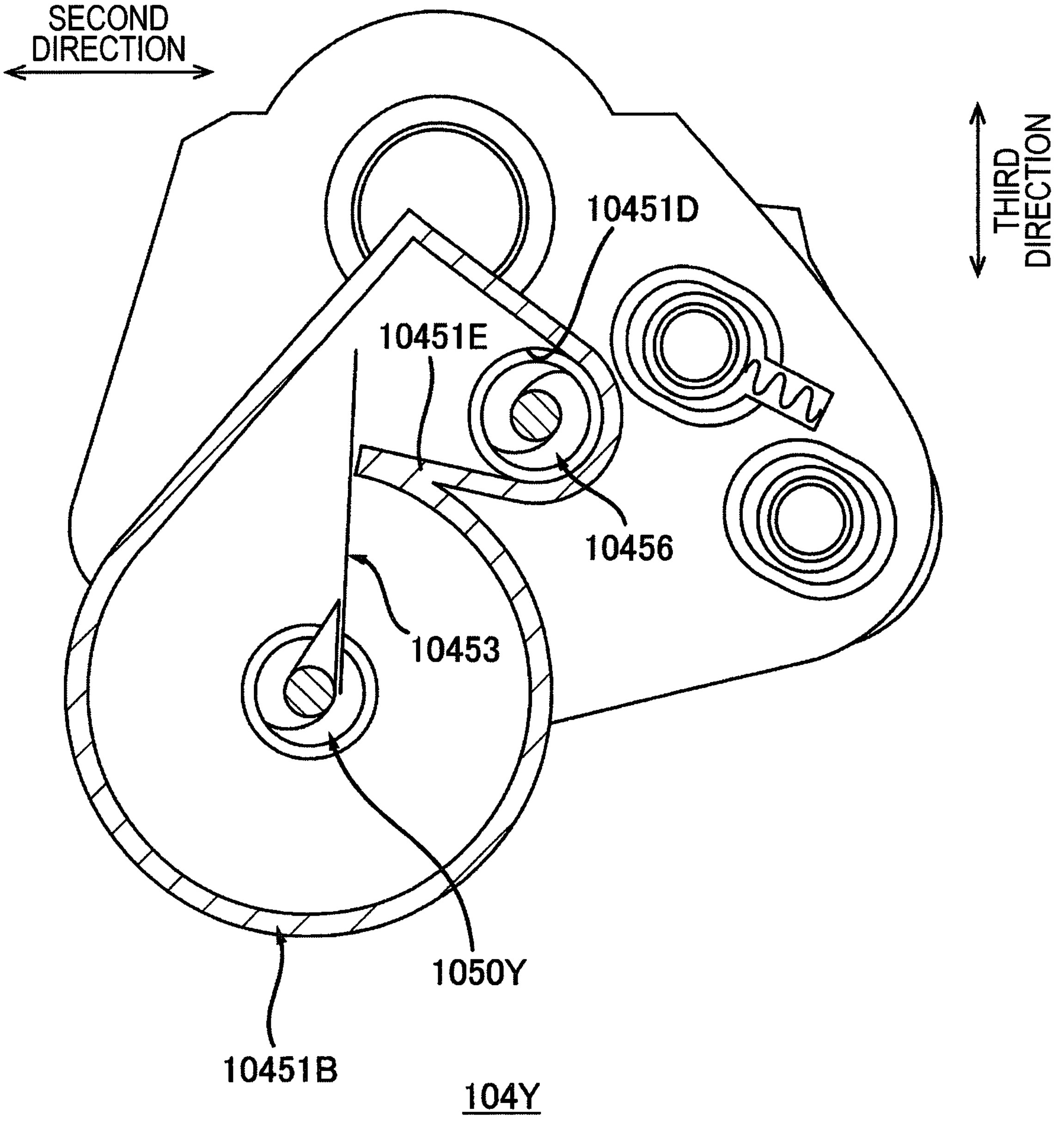
FIG. 21 is a cross-sectional view of the cartridge shown in FIG. 16, taken along a line XXI-XXI.

As shown in FIG. 16, the replenishment portion 1045Y includes a container 10451, a toner conveyor 10452 (see FIG. 20), an agitator 10453 (see FIG. 21), a lid 10454, a replenishment toner pipe 10455, and a replenishment toner conveyor 10456 (see FIGS. 19 and 21). In other words, the image forming apparatus 10 includes the container 10451 and the replenishment toner pipe 10455.

5.2.3.1 Container 10451

The container 10451 is connectable with the toner container BY (see FIG. 14). In a state where the toner container BY is connected to the container 10451, the container 10451 receives toner from the toner container BY. The container 10451 is located on the opposite side of the second drum side plate 10441B with respect to the first drum side plate 10441A in the first direction. The container 10451 extends in the third direction. The container 10451 has a cylindrical shape. The container 10451 has a first end E11 and a second end E12 in the third direction. As shown in FIG. 14, in a state where the cartridge 104Y is attached to the main housing 101 and the cover 102 is located at the closed position, the first end E11 is located outside the main housing 101. In a state where the cartridge 104Y is attached to the main housing 101 and the cover 102 is located at the closed position, The second end E12 is located inside the main housing 101.

As shown in FIG. 20, the container 10451 includes an insertion opening 10450Y, a toner reception portion 10451A, and an agitating portion 10451B (see FIG. 21). In other words, the replenishment portion 1045Y has the insertion opening 10450Y The insertion opening 10450Y is provided at the first end E11. The toner container BY (see FIG. 14) is inserted into the insertion opening 10450Y The toner reception portion 10451A communicates with the insertion opening 10450Y. The toner reception portion 10451A extends in the third direction from the first end E11 to the second end E12. The toner that has passed through the insertion opening 10450Y enters the toner reception portion 10451A.

As shown in FIG. 16, the agitating portion 10451B is located between the toner reception portion 10451A and the first drum side plate 10441A in the first direction. The agitating portion 10451B communicates with the toner reception portion 10451A through an opening 10451C (see FIG. 20). Thus, the toner in the toner reception portion 10451A enters the agitating portion 10451B through the opening 10451C. As shown in FIG. 21, the agitating portion 10451B has a discharge port 10451D and an inclined plate 10451E.

The discharge port 10451D communicates with one end of the replenishment toner pipe 10455 in the first direction (see FIG. 16). The discharge port 10451D allows passage of the toner discharged from the agitating portion 10451B to the replenishment toner pipe 10455. In a state where the cartridge 104Y is attached to the main housing 101, the discharge port 10451D is located at a higher position than the opening 10451C (see FIG. 20).

The inclined plate 10451E is located between the opening 10451C and the discharge port 10451D. The inclined plate 10451E extends toward the discharge port 10451D. In a state where the cartridge 104Y is attached to the main housing 101, the inclined plate 10451E is inclined downward toward the discharge port 10451D. Thus, the toner on the inclined plate 10451E flows toward the discharge port 10451D.

5.2.3.2 Toner Conveyor 10452

As shown in FIG. 20, the toner conveyor 10452 is located within the toner reception portion 10451A. The toner conveyor 10452 conveys the toner in toner reception portion 10451A toward the agitating portion 10451B in the first direction.

The toner conveyor 10452 is an auger screw. The toner conveyor 10452 is rotatable together with the return toner conveyor 1050Y (see FIG. 21).

5.2.3.3 Agitator 10453

As shown in FIG. 21, the agitator 10453 is located within the agitating portion 10451B.

The agitator 10453 agitates the toner in the agitating portion 10451B and conveys the toner to above the inclined plate 10451E. The agitator 10453 is rotatable together with the return toner conveyor 1050Y and the toner conveyor 10452 (see FIG. 20).

5.2.3.4 Lid 10454

As shown in FIG. 20, the lid 10454 is movable between a closed position (shown in solid lines in FIG. 20) and an open position (shown in imaginary lines in FIG. 20). In a state where the lid 10454 is located at the closed position, the lid 10454 closes the insertion opening 10450Y. In a state where the lid 10454 is located at the open position, the insertion opening 10450Y is opened. The lid 10454 has a flat plate shape. The lid 10454 is rotatable about an axis A21 between the closed position and the open position. The axis A21 extends in the third direction.

5.2.3.5 Replenishment Toner Pipe 10455

As shown in FIG. 16, the replenishment toner pipe 10455 allows passage of toner replenished from the container 10451 to the development unit 1043Y. In other words, the toner replenished from the container 10451 to the development unit 1043Y passes through the replenishment toner pipe 10455. The replenishment toner pipe 10455 connects the agitating portion 10451B of the container 10451 and the development housing 10431Y.

Specifically, the replenishment toner pipe 10455 extends in the first direction. The replenishment toner pipe 10455 has a cylindrical shape. One end of the replenishment toner pipe 10455 in the first direction is connected to the discharge port 10451D (see FIG. 21) of the agitating portion 10451B. The replenishment toner pipe 10455 penetrates the first drum side plate 10441A in the first direction. The other end of the replenishment toner pipe 10455 in the first direction is located between the development housing 10431Y and the first drum side plate 10441A. As shown in FIG. 19, in a state where the cartridge 104Y is attached to the main housing 101, the other end of the replenishment toner pipe 10455 in the first direction is located at a higher position than the reception port 10438A of the development housing 10431Y. The replenishment toner pipe 10455 has the discharge port 10455A.

The discharge port 10455A is located at the other end of the replenishment toner pipe 10455 in the first direction. The discharge port 10455A communicates with the reception port 10438A of the development housing 10431Y. The discharge port 10455A discharges the toner in the replenishment toner pipe 10455 to the reception port 10438A of the development housing 10431Y.

5.2.3.6 Replenishment Toner Conveyor 10456

The replenishment toner conveyor 10456 is located within the replenishment toner pipe 10455. The replenishment toner conveyor 10456 conveys the toner in the replenishment toner pipe 10455 toward the discharge port 10455A in the first direction. The replenishment toner conveyor 10456 is an auger screw.

5.2.4 Seal Member 1046Y

The seal member 1046Y is located between the reception portion 10438 of the development housing 10431Y and the other end of the replenishment toner pipe 10455 in the first direction. The seal member 1046Y is located around the discharge port 10455A of the replenishment toner pipe 10455 and around the reception port 10438A of the development housing 10431Y. The seal member 1046Y seals between the other end of the replenishment toner pipe 10455 in the first direction and the reception portion 10438 of the development housing 10431Y. The seal member 1046Y is elastically deformable according to the movement of the development unit 1043Y. The seal member 1046Y is made of sponge, for example.

As shown in FIG. 16, the seal member 1046Y is located between one end of the development housing 10431Y in the first direction and the first drum side plate 10441A.

5.2.5 Drum Cleaner 1047Y

As shown in FIG. 18, the drum cleaner 1047Y cleans the circumferential surface of the photosensitive drum 1041Y. The drum cleaner 1047Y removes, from the circumferential surface of the photosensitive drum 1041Y, the toner remaining on the circumferential surface of the photosensitive drum 1041Y without being transferred from the photosensitive drum 1041Y to the sheet S. The toner removed from the circumferential surface of the photosensitive drum 1041Y by the drum cleaner 1047Y becomes recovered toner.

The drum cleaner 1047Y includes a cleaner housing 10471, a cleaning member 10472, and a toner conveyor 10473.

The cleaner housing 10471 is located between the first drum side plate 10441A (see FIG. 16) and the second drum side plate 10441B (see FIG. 16) in the first direction. The cleaner housing 10471 extends in the first direction. One end of the cleaner housing 10471 in the first direction is connected to with the first drum side plate 10441A. The other end of the cleaner housing 10471 in the first direction is connected to the second drum side plate 10441B. The cleaner housing 10471 has an opening 10471A. The cleaner housing 10471 contains transfer residual toner.

The cleaning member 10472 is attached to the cleaner housing 10471. The cleaning member 10472 extends in the first direction. The cleaning member 10472 has a plate shape. The cleaning member 10472 cleans the circumferential surface of the photosensitive drum 1041Y. Specifically, an edge of the cleaning member 10472 contacts the circumferential surface of the photosensitive drum 1041Y. When the photosensitive drum 1041Y rotates, transfer residual toner remaining on the circumferential surface of the photosensitive drum 1041Y contacts the edge of the cleaning member 10472 and is removed from the circumferential surface of the photosensitive drum 1041Y. The removed residual toner is accommodated in the cleaner housing 10471 through the opening 10471A.

The toner conveyor 10473 is located within the cleaner housing 10471. The toner conveyor 10473 conveys the toner in the cleaner housing 10471 toward the return toner pipe 1048Y (see FIG. 19) in the first direction. The toner conveyor 10473 is an auger screw.

5.2.6 Return Toner Pipe 1048Y

As shown in FIG. 16, the return toner pipe 1048Y extends in the first direction. The return toner pipe 1048Y penetrates the first drum side plate 10441A in the first direction. One end of the return toner pipe 1048Y in the first direction is located on the opposite side of the development housing 10431Y with respect to the first drum side plate 10441A. The other end of the return toner pipe 1048Y in the first direction is located between the development housing 10431Y and the first drum side plate 10441A.

As shown in FIG. 19, the other end of return toner pipe 1048Y in the first direction is connected to one end of the cleaner housing 10471 in the first direction. The return toner pipe 1048Y communicates with the cleaner housing 10471. Thus, the return toner pipe 1048Y receives transfer residual toner from the cleaner housing 10471. In a state where the cartridge 104Y is attached to the main housing 2, the return toner pipe 1048Y is located at a lower position than the drum cleaner 1047Y.

The return toner pipe 1048Y also receives the toner discharged from the discharge port 10439A of the development housing 10431Y. More specifically, in a state where the cartridge 104Y is attached to the main housing 2, the return toner pipe 1048Y is located at a lower position than the toner conveyor 10473. In a state where the cartridge 104Y is attached to the main housing 2, the return toner pipe 1048Y is located at a lower position than the discharge port 10439A of the development housing 10431Y. The return toner pipe 1048Y has a reception port 10481.

The reception port 10481 is located at the other end of the return toner pipe 1048Y in the first direction. The reception port 10481 receives toner discharged from the discharge port 10439A of the development housing 10431Y.

One end of the return toner pipe 1048Y in the first direction is connected to the agitating portion 10451B of the container 10451. That is, the return toner pipe 1048Y is connected to the container 10451. The return toner pipe 1048Y allows the passage of toner returning from the cleaner housing 10471 to the agitating portion 10451B (see FIG. 16) of the container 10451 and toner returning from the development housing 10431Y to the agitating portion 10451B of the container 10451.

As shown in FIG. 21, the toner returned to the agitating portion 10451B of the container 10451 through the return toner pipe 1048Y is mixed with toner from the toner reception portion 10451A of the container 10451 in the agitating portion 10451B, and thereafter is again supplied to the development unit 1043Y through the replenishment toner pipe 10455 (see FIG. 16). That is, the return toner pipe 1048Y allows passage of the return toner returning from the photosensitive drum 1041Y via the container 10451 to the development unit 1043Y.

5.2.7 Seal Member 1049Y

As shown in FIG. 19, the seal member 1049Y is located between the discharge portion 10439 and the other end of the return toner pipe 1048Y in the first direction. The seal member 1049Y is located around the discharge port 10439A and the reception port 10481. The seal member 1049Y seals between the other end of the return toner pipe 1048Y in the first direction and the discharge portion 10439. The seal member 1049Y is elastically deformable according to the movement of the development unit 1043Y. The seal member 1049Y is made of sponge, for example.

As shown in FIG. 16, the seal member 1049Y is located between one end of the development housing 10431Y in the first direction and the first drum side plate 10441A.

5.2.8 Return Toner Conveyor 1050Y

As shown in FIG. 19, the return toner conveyor 1050Y is located within the return toner pipe 1048Y. The return toner conveyor 1050Y conveys the toner in the return toner pipe 1048Y toward the container 10451 (see FIG. 16) in the first direction. In this embodiment, the return toner conveyor 1050Y is an auger screw.

5.3 Cartridge 104M

As described above and shown in FIG. 13, the cartridge 104M has the same structure as the cartridge 104Y. That is, like the cartridge 104Y, the cartridge 104M includes a photosensitive drum 1041M, a drum frame 1044M, a development unit 1043M, a replenishment portion 1045M, and a return toner pipe 1048M. In other words, the image forming apparatus includes the photosensitive drum 1041M, the drum frame 1044M, the development unit 1043M, the replenishment portion 1045M, and the return toner pipe 1048M. For convenience, the drum frame 1044M, the replenishment portion 1045M, and the return toner pipe 1048M are shown in FIG. 16 since the cartridge 104M has the same configuration as the cartridge 104Y.

The drum frame 1044M supports the photosensitive drum 1041M. The development unit 1043M is supported by the drum frame 1044M. The development unit 1043M is movable with respect to the photosensitive drum 1041M. The development unit 1043M includes a development housing 10431M and a development roller 10432M. In other words, the image forming apparatus 10 includes the development housing 10431M and the development roller 10432M. The development housing 10431M contains toner. The development roller 10432M supplies the toner in the development housing 10431M to the photosensitive drum 1041M. The replenishment portion 1045M is connectable to the toner container BM. The replenishment portion 1045M supplies toner from the toner container BM to the development unit 1043M. The container 10451 of the replenishment portion 1045M has an insertion opening 10450M. The toner container BM is inserted into the insertion opening 10450M. Return toner returning from the photosensitive drum 1041M to the development unit 1043M passes through the return toner pipe 1048M.

5.4 Operations and Effects

According to the image forming apparatus 10 of the second embodiment, as shown in FIG. 16, the return toner pipe 1048Y is connected to the container 10451 of the replenishment portion 1045Y.

Thus, the toner replenished to the development housing 10431Y and the return toner from the photosensitive drum 1041Y are mixed in the container 10451 of the replenishment portion 1045Y, the replenishment toner pipe 10455 of the replenishment portion 1045Y, and the development housing 10431Y.

Thus, the return toner and the replenished toner are sufficiently mixed before being supplied to the development roller 10432Y.

As a result, the influence of the return toner on the image quality is further suppressed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An image forming apparatus comprising:

a main housing;

a photosensitive drum;

a development housing configured to contain toner;

a development roller configured to supply toner in the development housing to the photosensitive drum;

a container having an insertion opening configured such that a toner container is inserted therein, the toner container containing toner to be replenished to the development housing;

a drum cleaner configured to collect toner on a circumferential surface of the photosensitive drum, and a return toner pipe configured to allow passage of return toner, the return toner being toner that returns from the photosensitive drum to the development housing, the return toner pipe being configured to return the toner collected by the drum cleaner to the development housing.

2. The image forming apparatus according to claim 1, wherein the development roller is rotatable about a development axis extending in a first direction;

wherein the image forming apparatus further comprises a replenishment toner pipe through which replenished toner passes, the replenished toner being toner that is replenished from the container to the development housing;

wherein the replenishment toner pipe is connected to a center portion of the development housing in the first direction; and wherein the return toner pipe is connected to the replenishment toner pipe.

3. The image forming apparatus according to claim 1, further comprising a replenishment toner pipe through which replenished toner passes, the replenished toner being toner that is replenished from the container to the development housing.

4. The image forming apparatus according to claim 3, wherein the development roller is rotatable about a development axis extending in a first direction;

wherein the replenishment toner pipe is connected to a center portion of the development housing in the first direction; and wherein the return toner pipe is connected to the replenishment toner pipe.

5. The image forming apparatus according to claim 1, wherein the development roller is rotatable about a development axis extending in a first direction;

wherein the image forming apparatus further comprises a replenishment toner pipe through which replenished toner passes, the replenished toner being toner that is replenished from the container to the development housing; and wherein the replenishment toner pipe and the return toner pipe are connected to a center portion of the development housing in the first direction.

6. The image forming apparatus according to claim 1, wherein the development housing includes:

a partition wall partitioning an internal space of the development housing into a first development chamber accommodating part of the development roller and a second development chamber, the partition wall having a first opening and a second opening, the first opening allowing passage of toner from the second development chamber to the first development chamber, the second opening allowing passage of toner from the first development chamber to the second development chamber;

wherein the image forming apparatus further comprises:

a first conveyor located in the first development chamber, the first conveyor being configured to convey toner in the first development chamber from the first opening toward the second opening;

a second conveyor located in the second development chamber, the second conveyor being configured to convey toner in the second development chamber from the second opening toward the first opening; and a replenishment toner pipe through which replenished toner passes, the replenished toner being toner that is replenished from the container to the development housing; and wherein the replenishment toner pipe and the return toner pipe are connected to the second development chamber.

7. The image forming apparatus according to claim 6, wherein the first conveyor and the second conveyor are auger screws.

8. The image forming apparatus according to claim 1, wherein the development roller is rotatable about a development axis extending in a first direction;

wherein the development housing includes:

a main body portion including:

a first development side wall supporting one end of the development roller in the first direction;

a second development side wall supporting an other end of the development roller in the first direction; and a partition wall partitioning an internal space of the development housing into a first development chamber accommodating part of the development roller and a second development chamber, the partition wall having a first opening and a second opening, the first opening allowing passage of toner from the second development chamber to the first development chamber, the second opening allowing passage of toner from the first development chamber to the second development chamber; and a protruding portion located on an opposite side of the second development side wall with respect to the first development side wall in the first direction, the protruding portion protruding from the first development side wall, the protruding portion having an internal space communicating with the second development chamber;

wherein the image forming apparatus further comprises:

a first conveyor located in the first development chamber, the first conveyor being configured to convey toner in the first development chamber from the first opening toward the second opening;

a second conveyor located in the second development chamber, the second conveyor being configured to convey toner in the second development chamber from the second opening toward the first opening; and a replenishment toner pipe through which replenished toner passes, the replenished toner being toner that is replenished from the container to the development housing; and wherein the replenishment toner pipe and the return toner pipe are connected to the protruding portion.

9. The image forming apparatus according to claim 1, wherein the development roller is rotatable about a development axis extending in a first direction;

wherein the image forming apparatus further comprises a drum frame including:

a first drum side plate supporting one end of the photosensitive drum in the first direction; and a second drum side plate supporting an other end of the photosensitive drum in the first direction; and wherein the container is located on the first drum side plate.

10. The image forming apparatus according to claim 1, wherein the return toner pipe is connected to the container.

11. The image forming apparatus according to claim 1, further comprising:

a cartridge including the photosensitive drum, the development housing, the development roller, the container, and the return toner pipe, the cartridge being attachable to and detachable from the main housing, wherein the development roller is rotatable about a development axis extending in a first direction; and wherein the main housing has a side wall on one side in the first direction, the side wall having a main opening allowing passage of the cartridge.

12. The image forming apparatus according to claim 1, further comprising:

a second photosensitive drum;

a second development housing configured to contain toner;

a second development roller configured to supply toner in the second development housing to the second photosensitive drum;

a second container having a second insertion opening configured such that a second toner container is inserted therein, the second toner container containing toner to be replenished to the second development housing; and a second return toner pipe configured to allow passage of return toner, the return toner being toner that returns from the second photosensitive drum to the second development housing.

13. The image forming apparatus according to claim 1, further comprising a replenishment toner pipe through which replenished toner passes, the replenished toner being toner that is replenished from the container to the development housing, wherein one end of the return toner pipe is connected to the drum cleaner; and wherein an other end of the return toner pipe is connected to the replenishment toner pipe, the development housing, or the container.

14. The image forming apparatus according to claim 1, wherein the development roller is rotatable about a development axis extending in a first direction;

wherein the image forming apparatus further comprises a drum frame including:

a first drum side plate supporting one end of the photosensitive drum in the first direction; and a second drum side plate supporting an other end of the photosensitive drum in the first direction; and wherein the return toner pipe extends on a side opposite from the second drum side plate with respect to the first drum side plate.

15. A cartridge comprising:

a photosensitive drum;

a development housing configured to contain toner;

a development roller configured to supply toner in the development housing to the photosensitive drum;

a container having an insertion opening configured such that a toner container is inserted therein, the toner container containing toner to be replenished to the development housing;

a drum cleaner configured to collect toner on a circumferential surface of the photosensitive drum; and a return toner pipe configured to allow passage of return toner, the return toner being toner that returns from the photosensitive drum to the development housing, the return toner pipe being configured to return the toner collected by the drum cleaner to the development housing.

16. The cartridge according to claim 15, wherein the development roller is rotatable about a development axis extending in a first direction;

wherein the cartridge further comprises a replenishment toner pipe through which replenished toner passes, the replenished toner being toner that is replenished from the container to the development housing;

wherein the replenishment toner pipe is connected to a center portion of the development housing in the first direction; and wherein the return toner pipe is connected to the replenishment toner pipe.

17. The cartridge according to claim 15, wherein the development roller is rotatable about a development axis extending in a first direction;

wherein the cartridge further comprises a replenishment toner pipe through which replenished toner passes, the replenished toner being toner that is replenished from the container to the development housing; and wherein the replenishment toner pipe and the return toner pipe are connected to a center portion of the development housing in the first direction.

18. The cartridge according to claim 15, wherein the development housing includes:

a partition wall partitioning an internal space of the development housing into a first development chamber accommodating part of the development roller and a second development chamber, the partition wall having a first opening and a second opening, the first opening allowing passage of toner from the second development chamber to the first development chamber, the second opening allowing passage of toner from the first development chamber to the second development chamber;

wherein the cartridge further comprises:

a first conveyor located in the first development chamber, the first conveyor being configured to convey toner in the first development chamber from the first opening toward the second opening;

a second conveyor located in the second development chamber, the second conveyor being configured to convey toner in the second development chamber from the second opening toward the first opening; and a replenishment toner pipe through which replenished toner passes, the replenished toner being toner that is replenished from the container to the development housing; and wherein the replenishment toner pipe and the return toner pipe are connected to the second development chamber.

19. The cartridge according to claim 18, wherein the first conveyor and the second conveyor are auger screws.

20. The cartridge according to claim 15, wherein the development roller is rotatable about a development axis extending in a first direction;

wherein the development housing includes:

a main body portion including:

a first development side wall supporting one end of the development roller in the first direction;

a second development side wall supporting an other end of the development roller in the first direction; and a partition wall partitioning an internal space of the development housing into a first development chamber accommodating part of the development roller and a second development chamber, the partition wall having a first opening and a second opening, the first opening allowing passage of toner from the second development chamber to the first development chamber, the second opening allowing passage of toner from the first development chamber to the second development chamber; and a protruding portion located on an opposite side of the second development side wall with respect to the first development side wall in the first direction, the protruding portion protruding from the first development side wall, the protruding portion having an internal space communicating with the second development chamber;

wherein the cartridge further comprises:

a first conveyor located in the first development chamber, the first conveyor being configured to convey toner in the first development chamber from the first opening toward the second opening;

a second conveyor located in the second development chamber, the second conveyor being configured to convey toner in the second development chamber from the second opening toward the first opening; and a replenishment toner pipe through which replenished toner passes, the replenished toner being toner that is replenished from the container to the development housing; and wherein the replenishment toner pipe and the return toner pipe are connected to the protruding portion.

21. The cartridge according to claim 15, wherein the development roller is rotatable about a development axis extending in a first direction;

wherein the cartridge further comprises a drum frame including:

a first drum side plate supporting one end of the photosensitive drum in the first direction; and a second drum side plate supporting an other end of the photosensitive drum in the first direction; and wherein the container is located on the first drum side plate.

22. The cartridge according to claim 15, wherein the return toner pipe is connected to the container.

* * * * *